(12) United States Patent
Chiba

(10) Patent No.: US 7,605,847 B2
(45) Date of Patent: Oct. 20, 2009

(54) DIGITAL CAMERA HAVING SUBJECT JUDGMENT FUNCTION

(75) Inventor: Toru Chiba, Tokyo (JP)

(73) Assignee: Hoya Corporation, Tokyo (JP)

( * ) Notice: Subject to any disclaimer, the term of this patent is extended or adjusted under 35 U.S.C. 154(b) by 938 days.

(21) Appl. No.: 10/973,617

(22) Filed: Oct. 27, 2004

(65) Prior Publication Data
US 2005/0089218 A1 Apr. 28, 2005

(30) Foreign Application Priority Data
Oct. 27, 2003 (JP) ............................. 2003-366319

(51) Int. Cl.
*H04N 5/228* (2006.01)
*H04N 7/18* (2006.01)
*G06K 9/00* (2006.01)

(52) U.S. Cl. .................... 348/222.1; 348/161; 382/115; 382/181

(58) Field of Classification Search ............. 348/222.1, 348/223.1, 161, 129, 130; 382/115, 181
See application file for complete search history.

(56) References Cited

U.S. PATENT DOCUMENTS

| 4,451,929 | A | * | 5/1984 | Yoshida | 382/155 |
| 5,469,512 | A | * | 11/1995 | Fujita et al. | 382/118 |
| 6,876,755 | B1 | * | 4/2005 | Taylor et al. | 382/118 |
| 6,940,545 | B1 | * | 9/2005 | Ray et al. | 348/222.1 |
| 6,961,465 | B2 | * | 11/2005 | Shah | 382/181 |
| 7,184,078 | B2 | * | 2/2007 | Okisu et al. | 348/222.1 |
| 7,305,122 | B2 | * | 12/2007 | Ii et al. | 382/159 |
| 2002/0031261 | A1 | | 3/2002 | Abe | |
| 2002/0039445 | A1 | | 4/2002 | Abe et al. | |
| 2003/0007076 | A1 | | 1/2003 | Okisu | |
| 2003/0107653 | A1 | * | 6/2003 | Utsumi et al. | 348/207.99 |

FOREIGN PATENT DOCUMENTS

JP 2003-18453 1/2003

* cited by examiner

*Primary Examiner*—Nhan T Tran
(74) *Attorney, Agent, or Firm*—Greenblum & Bernstein, P.L.C.

(57) ABSTRACT

A subject judgment program is capable of reducing the calculation load on a computer functioning as a device for judging the subject in a subject image. In a controller of a digital still camera, when a CPU running the subject judgment program (stored in a flash memory) obtains image data from an A/D converter via a first interface circuit, the CPU generates two-dimensional distribution data of product-moment correlation coefficients for each of model image data stored in the flash memory by successively calculating the product-moment correlation coefficient between the model image data and each part of the obtained image data, identifies a piece of model image data corresponding to two-dimensional distribution data having the highest maximum value, and thereby identifies subject information which has been associated with the identified model image data.

8 Claims, 32 Drawing Sheets

Figure 1:
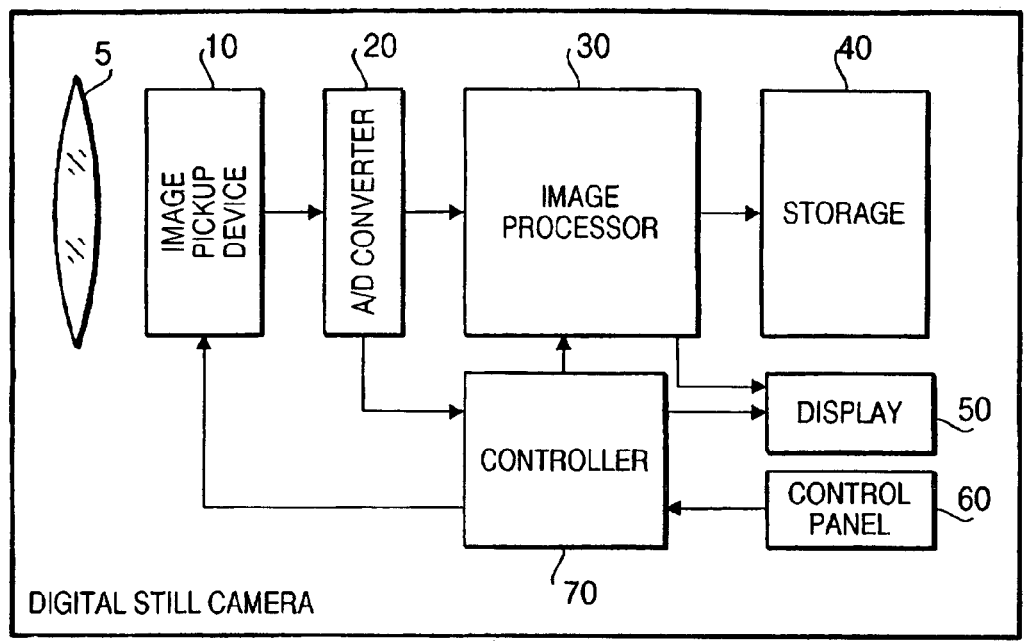

| FILE NAME | SUBJECT INFORMATION |
|---|---|
| aaa. jpeg | PORTRAIT |
| bbb. jpeg | RED LEAVES |
| ccc. jpeg | FLOWERS |
| ⋮ | ⋮ |

FIG. 3

Fig. 9

|    | 6     | 7     | 8     | 9     | 10    | 11    | 12    | 13    | 14    | 15   | 16   |
|----|-------|-------|-------|-------|-------|-------|-------|-------|-------|------|------|
| 29 | 0.117 | 0.213 | 0.261 | 0.264 | 0.230 | 0.140 | 0.012 | -0.5  | -0.5  | -0.5 | -0.5 |
| 30 | 0.156 | 0.285 | 0.338 | 0.358 | 0.334 | 0.169 | 0.028 | -0.5  | -0.5  | -0.5 | -0.5 |
| 31 | 0.181 | 0.316 | 0.453 | 0.191 | 0.443 | 0.208 | -0.5  | -0.5  | -0.5  | -0.5 | -0.5 |
| 32 | 0.200 | 0.337 | 0.534 | 0.615 | 0.526 | 0.291 | 0.052 | -0.5  | -0.5  | -0.5 | -0.5 |
| 33 | 0.214 | 0.367 | 0.622 | 0.813 | 0.622 | 0.314 | -0.5  | -0.5  | -0.5  | -0.5 | -0.5 |
| 34 | 0.206 | 0.371 | 0.678 | 0.997 | 0.661 | 0.282 | -0.5  | -0.5  | -0.5  | -0.5 | -0.5 |
| 35 | 0.209 | 0.379 | 0.628 | 0.813 | 0.595 | 0.255 | -0.5  | -0.5  | -0.5  | -0.5 | -0.5 |
| 36 | 0.224 | 0.345 | 0.515 | 0.599 | 0.471 | 0.172 | -0.5  | -0.5  | -0.5  | -0.5 | -0.5 |
| 37 | 0.212 | 0.267 | 0.401 | 0.426 | 0.307 | 0.095 | -0.5  | -0.5  | -0.5  | -0.5 | -0.5 |
| 38 | 0.143 | 0.171 | 0.289 | 0.283 | 0.184 | 0.095 | -0.5  | -0.5  | -0.5  | -0.5 | -0.5 |
| 39 | -0.5  | 0.084 | 0.149 | 0.192 | 0.143 | 0.085 | 0.055 | 0.036 | 0.025 | -0.5 | -0.5 |

Fig. 14

| | 6 | 7 | 8 | 9 | 10 | 11 | 12 | 13 | 14 | 15 | 16 |
|---|---|---|---|---|---|---|---|---|---|---|---|
| 29 | -0.5 | -0.5 | -0.5 | -0.5 | -0.5 | -0.5 | -0.5 | -0.5 | -0.5 | -0.5 | -0.5 |
| 30 | -0.5 | -0.5 | -0.5 | -0.5 | -0.5 | -0.5 | -0.5 | -0.5 | -0.5 | -0.5 | -0.5 |
| 31 | -0.5 | -0.5 | -0.5 | -0.5 | -0.5 | -0.5 | -0.5 | -0.5 | -0.5 | -0.5 | -0.5 |
| 32 | -0.5 | -0.5 | -0.5 | -0.5 | -0.5 | -0.5 | -0.5 | -0.5 | -0.5 | -0.5 | -0.5 |
| 33 | -0.5 | -0.5 | -0.5 | -0.5 | -0.5 | -0.5 | -0.5 | -0.5 | -0.5 | -0.5 | -0.5 |
| 34 | -0.5 | -0.5 | -0.5 | -0.5 | -0.5 | -0.5 | -0.5 | -0.5 | -0.5 | -0.5 | -0.5 |
| 35 | -0.5 | -0.5 | -0.5 | -0.5 | -0.5 | -0.5 | -0.5 | -0.5 | -0.5 | -0.5 | -0.5 |
| 36 | -0.5 | -0.5 | -0.5 | 3E-03 | -0.5 | -0.5 | -0.5 | -0.5 | -0.5 | -0.5 | -0.5 |
| 37 | -0.5 | -0.5 | -0.5 | -0.5 | -0.5 | -0.5 | -0.5 | -0.5 | -0.5 | -0.5 | -0.5 |
| 38 | -0.5 | -0.5 | -0.5 | -0.5 | -0.5 | -0.5 | -0.5 | -0.5 | -0.5 | -0.5 | -0.5 |
| 39 | -0.5 | -0.5 | -0.5 | -0.5 | -0.5 | -0.5 | -0.5 | -0.5 | -0.5 | -0.5 | -0.5 |

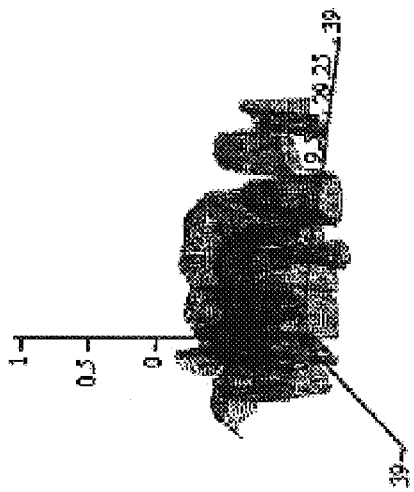
FIG. 17    FIG. 18
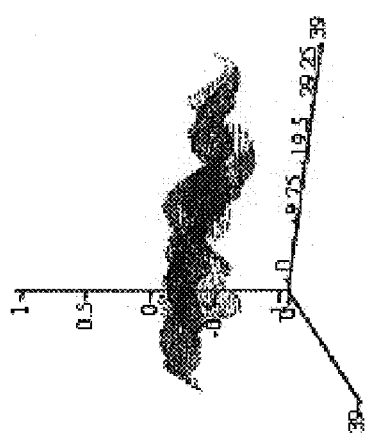
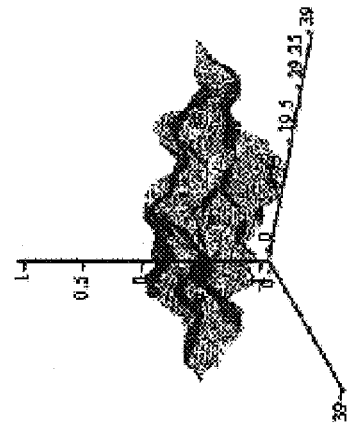
FIG. 20

Fig. 19

|    | 0 | 1 | 2 | 3 | 4 | 5 | 6 | 7 | 8 | 9 | 10 |
|----|---|---|---|---|---|---|---|---|---|---|----|
| 29 | 0.060 | 0.095 | 0.099 | 0.108 | 0.136 | 0.137 | 0.114 | 0.159 | 0.204 | 0.196 | 0.149 |
| 30 | 0.105 | 0.142 | 0.123 | 0.163 | 0.197 | 0.186 | 0.152 | 0.150 | 0.168 | 0.183 | 0.093 |
| 31 | 0.128 | 0.179 | 0.187 | 0.222 | 0.228 | 0.206 | 0.183 | 0.163 | 0.075 | 0.006 | -0.5 |
| 32 | 0.157 | 0.218 | 0.254 | 0.249 | 0.243 | 0.212 | 0.175 | 0.124 | -0.5 | -0.5 | -0.5 |
| 33 | 0.176 | 0.230 | 0.267 | 0.279 | 0.262 | 0.229 | 0.190 | 0.084 | -0.5 | -0.5 | -0.5 |
| 34 | 0.175 | 0.239 | 0.271 | 0.299 | 0.280 | 0.264 | 0.235 | 0.106 | -0.5 | -0.5 | -0.5 |
| 35 | 0.148 | 0.237 | 0.289 | 0.302 | 0.264 | 0.228 | 0.198 | 0.114 | -0.5 | -0.5 | -0.5 |
| 36 | 0.135 | 0.220 | 0.277 | 0.268 | 0.241 | 0.191 | 0.126 | 0.063 | -0.5 | -0.5 | -0.5 |
| 37 | 0.149 | 0.217 | 0.246 | 0.214 | 0.186 | 0.158 | 0.074 | -0.5 | -0.5 | -0.5 | -0.5 |
| 38 | 0.151 | 0.211 | 0.229 | 0.182 | 0.088 | 0.099 | -0.5 | -0.5 | -0.5 | -0.5 | -0.5 |
| 39 | 0.140 | 0.196 | 0.199 | 0.116 | 0.059 | 0.053 | 0.042 | -0.5 | -0.5 | -0.5 | -0.5 |

Fig. 24

|    | 6     | 7     | 8     | 9     | 10    | 11    | 12    | 13    | 14    | 15    | 16    |
|----|-------|-------|-------|-------|-------|-------|-------|-------|-------|-------|-------|
| 29 | 0.172 | 0.120 | 0.040 | 0.017 | -0.5  | -0.5  | -0.5  | -0.5  | -0.5  | -0.5  | -0.5  |
| 30 | 0.204 | 0.167 | 0.130 | 0.079 | 0.056 | 0.042 | 0.032 | -0.5  | -0.5  | -0.5  | -0.5  |
| 31 | 0.230 | 0.224 | 0.162 | 0.117 | 0.095 | 0.095 | 0.076 | -0.5  | -0.5  | -0.5  | -0.5  |
| 32 | 0.237 | 0.257 | 0.212 | 0.165 | 0.143 | 0.125 | 0.097 | 0.045 | 0.027 | 0.039 | 0.068 |
| 33 | 0.218 | 0.251 | 0.243 | 0.198 | 0.171 | 0.152 | 0.136 | 0.089 | 0.075 | 0.104 | 0.127 |
| 34 | 0.167 | 0.228 | 0.268 | 0.231 | 0.204 | 0.179 | 0.165 | 0.139 | 0.135 | 0.168 | 0.173 |
| 35 | 0.096 | 0.196 | 0.270 | 0.256 | 0.232 | 0.208 | 0.199 | 0.195 | 0.195 | 0.208 | 0.203 |
| 36 | 0.072 | 0.179 | 0.260 | 0.272 | 0.256 | 0.245 | 0.246 | 0.237 | 0.241 | 0.225 | 0.209 |
| 37 | 0.108 | 0.176 | 0.255 | 0.282 | 0.282 | 0.280 | 0.279 | 0.271 | 0.275 | 0.253 | 0.205 |
| 38 | 0.112 | 0.187 | 0.253 | 0.300 | 0.323 | 0.313 | 0.295 | 0.305 | 0.309 | 0.285 | 0.195 |
| 39 | 0.134 | 0.204 | 0.248 | 0.301 | 0.349 | 0.338 | 0.319 | 0.328 | 0.320 | 0.291 | 0.191 |

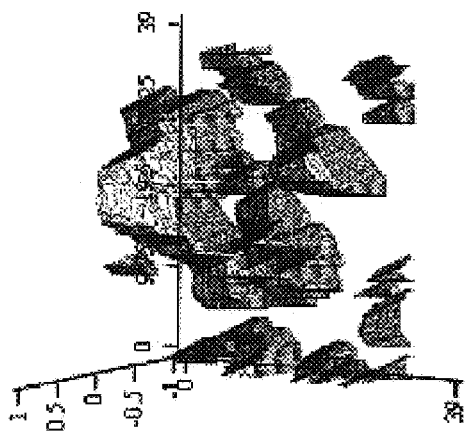
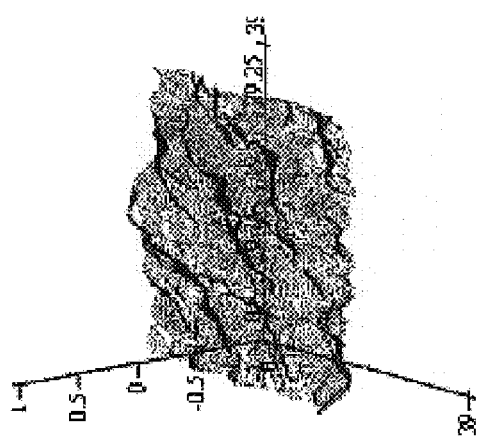
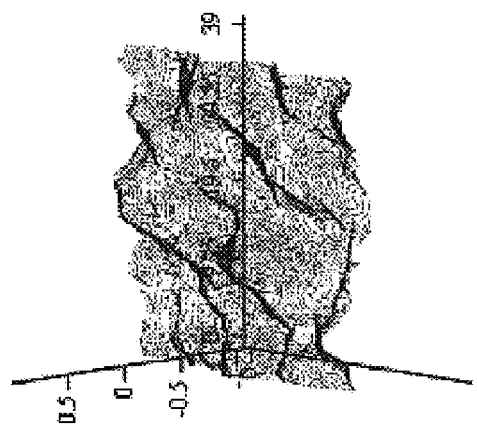

Fig. 30

|    | 0     | 1     | 2     | 3     | 4     | 5     | 6     | 7     | 8     | 9     | 10    |
|----|-------|-------|-------|-------|-------|-------|-------|-------|-------|-------|-------|
| 0  | -0.5  | -0.5  | -0.5  | -0.5  | 0.049 | 0.078 | 0.095 | 0.124 | 0.153 | 0.159 | 0.165 |
| 1  | -0.5  | -0.5  | -0.5  | 0.020 | 0.085 | 0.122 | 0.141 | 0.165 | 0.181 | 0.170 | 0.169 |
| 2  | -0.5  | 0.028 | 0.069 | 0.087 | 0.126 | 0.154 | 0.158 | 0.177 | 0.185 | 0.175 | 0.164 |
| 3  | -0.5  | 0.072 | 0.096 | 0.108 | 0.154 | 0.175 | 0.167 | 0.174 | 0.178 | 0.173 | 0.164 |
| 4  | 0.040 | 0.100 | 0.112 | 0.126 | 0.164 | 0.185 | 0.178 | 0.187 | 0.193 | 0.180 | 0.162 |
| 5  | 0.063 | 0.127 | 0.143 | 0.159 | 0.193 | 0.205 | 0.196 | 0.193 | 0.194 | 0.177 | 0.158 |
| 6  | 0.124 | 0.162 | 0.171 | 0.184 | 0.211 | 0.214 | 0.198 | 0.186 | 0.181 | 0.176 | 0.161 |
| 7  | 0.151 | 0.175 | 0.187 | 0.197 | 0.212 | 0.210 | 0.198 | 0.182 | 0.170 | 0.168 | 0.159 |
| 8  | 0.147 | 0.171 | 0.198 | 0.202 | 0.201 | 0.189 | 0.180 | 0.171 | 0.176 | 0.184 | 0.175 |
| 9  | 0.143 | 0.141 | 0.174 | 0.186 | 0.196 | 0.198 | 0.188 | 0.186 | 0.197 | 0.200 | 0.185 |
| 10 | 0.125 | 0.142 | 0.192 | 0.209 | 0.215 | 0.215 | 0.206 | 0.199 | 0.201 | 0.202 | 0.190 |

Fig. 36

|    | 1     | 2     | 3     | 4     | 5     | 6     | 7     | 8     | 9     |
|----|-------|-------|-------|-------|-------|-------|-------|-------|-------|
| 1  | -0.5  | 0.192 | 0.338 | 0.468 | 0.523 | 0.455 | 0.322 | 0.219 | 0.152 |
| 2  | -0.5  | 0.184 | 0.363 | 0.556 | 0.651 | 0.569 | 0.402 | 0.258 | 0.165 |
| 3  | -0.5  | 0.157 | 0.397 | 0.646 | 0.833 | 0.683 | 0.424 | 0.257 | 0.171 |
| 4  | 0.019 | 0.146 | 0.406 | 0.731 | 1.000 | 0.736 | 0.444 | 0.299 | 0.224 |
| 5  | 0.042 | 0.143 | 0.407 | 0.692 | 0.845 | 0.659 | 0.434 | 0.293 | 0.220 |
| 6  | 0.040 | 0.083 | 0.343 | 0.567 | 0.672 | 0.585 | 0.420 | 0.291 | 0.217 |
| 7  | -0.5  | -0.5  | 0.268 | 0.457 | 0.569 | 0.511 | 0.383 | 0.286 | 0.212 |
| 8  | -0.5  | -0.5  | 0.175 | 0.368 | 0.487 | 0.467 | 0.391 | 0.306 | 0.208 |
| 9  | -0.5  | -0.5  | -0.5  | 0.294 | 0.399 | 0.397 | 0.341 | 0.267 | 0.178 |
| 10 | -0.5  | -0.5  | -0.5  | 0.210 | 0.320 | 0.345 | 0.312 | 0.248 | 0.154 |
| 11 | -0.5  | -0.5  | -0.5  | 0.151 | 0.266 | 0.297 | 0.288 | 0.239 | 0.138 |
| 12 | -0.5  | -0.5  | -0.5  | 0.110 | 0.215 | 0.258 | 0.265 | 0.226 | 0.122 |
| 13 | -0.5  | -0.5  | -0.5  | 0.099 | 0.184 | 0.234 | 0.232 | 0.201 | 0.084 |
| 14 | -0.5  | -0.5  | -0.5  | 0.087 | 0.160 | 0.229 | 0.229 | 0.183 | 0.020 |
| 15 | -0.5  | -0.5  | -0.5  | 0.079 | 0.154 | 0.232 | 0.232 | 0.170 | -0.5  |
| 16 | 0.059 | 0.080 | 0.058 | 0.084 | 0.157 | 0.226 | 0.236 | 0.176 | 0.053 |
| 17 | 0.092 | 0.121 | 0.104 | 0.103 | 0.166 | 0.239 | 0.253 | 0.199 | 0.113 |

Fig. 41

|    | 1     | 2     | 3     | 4     | 5     | 6       | 7         | 8    |
|----|-------|-------|-------|-------|-------|---------|-----------|------|
| 1  | 0.045 | 0.060 | 0.062 | 0.052 | 0.013 | -0.5    | -0.5      | -0.5 |
| 2  | 0.057 | 0.067 | 0.074 | 0.059 | 0.026 | -0.5    | -0.5      | -0.5 |
| 3  | 0.084 | 0.079 | 0.088 | 0.068 | 0.037 | 1.97E-03| -0.5      | -0.5 |
| 4  | 0.102 | 0.091 | 0.084 | 0.072 | 0.044 | 9.96E-03| -0.5      | -0.5 |
| 5  | 0.090 | 0.071 | 0.080 | 0.062 | 0.029 | -0.5    | -0.5      | -0.5 |
| 6  | 0.073 | -0.5  | 0.079 | 0.071 | -0.5  | -0.5    | -0.5      | -0.5 |
| 7  | 0.072 | 0.015 | 0.083 | 0.084 | 0.025 | -0.5    | -0.5      | -0.5 |
| 8  | 0.125 | 0.119 | 0.132 | 0.110 | 0.059 | -0.5    | -0.5      | -0.5 |
| 9  | 0.182 | 0.166 | 0.156 | 0.127 | 0.070 | -0.5    | -0.5      | -0.5 |
| 10 | 0.227 | 0.198 | 0.177 | 0.120 | 0.067 | -0.5    | -0.5      | -0.5 |
| 11 | 0.232 | 0.202 | 0.169 | 0.095 | 0.043 | -0.5    | -0.5      | -0.5 |
| 12 | 0.209 | 0.167 | 0.122 | 0.067 | -0.5  | -0.5    | -0.5      | -0.5 |
| 13 | 0.168 | 0.123 | 0.023 | -0.5  | -0.5  | -0.5    | -0.5      | -0.5 |
| 14 | 0.130 | 0.053 | -0.5  | -0.5  | -0.5  | -0.5    | -0.5      | -0.5 |
| 15 | 0.065 | -0.5  | -0.5  | -0.5  | -0.5  | -0.5    | -0.5      | -0.5 |
| 16 | -0.5  | -0.5  | -0.5  | -0.5  | -0.5  | -0.5    | -0.5      | -0.5 |
| 17 | -0.5  | -0.5  | -0.5  | -0.5  | -0.5  | -0.5    | -0.5      | -0.5 |
| 18 | -0.5  | -0.5  | -0.5  | -0.5  | -0.5  | -0.5    | -5.00E-01 | -0.5 |
| 19 | -0.5  | -0.5  | -0.5  | -0.5  | -0.5  | -0.5    | -0.5      | -0.5 |
| 20 | -0.5  | -0.5  | -0.5  | -0.5  | -0.5  | -0.5    | -0.5      | -0.5 |
| 21 | -0.5  | -0.5  | -0.5  | -0.5  |-5.00E-01| -0.5  | -0.5      | -0.5 |
| 22 | -0.5  | -0.5  | -0.5  | -0.5  |-5.00E-01| -0.5  | -0.5      | -0.5 |
| 23 | -0.5  | -0.5  | -0.5  | -0.5  | -0.5  | -0.5    | -0.5      | -0.5 |
| 24 | -0.5  | -0.5  | -0.5  | -0.5  | -0.5  | -0.5    | -0.5      | -0.5 |

Fig. 46

|    | 1 | 2 | 3 | 4 | 5 | 6 | 7 |
|----|---|---|---|---|---|---|---|
| 1  | -0.5 | -0.5 |  | -0.5 | -0.5 | -0.5 | -0.5 |
| 2  | -0.5 | 0.096 | 0.06 | 0.069 | -0.5 | -0.5 | -0.5 |
| 3  | 0.094 | 0.159 | 0.108 | 0.142 | 0.108 | 0.086 | 0.083 |
| 4  | 0.176 | 0.232 | 0.165 | 0.220 | 0.188 | 0.171 | 0.167 |
| 5  | 0.229 | 0.288 | 0.245 | 0.293 | 0.253 | 0.226 | 0.206 |
| 6  | 0.263 | 0.315 | 0.313 | 0.325 | 0.293 | 0.257 | 0.222 |
| 7  | 0.274 | 0.311 | 0.340 | 0.332 | 0.317 | 0.283 | 0.241 |
| 8  | 0.258 | 0.280 | 0.330 | 0.334 | 0.330 | 0.296 | 0.251 |
| 9  | 0.238 | 0.237 | 0.308 | 0.313 | 3.24E-01 | 0.286 | 0.230 |
| 10 | 0.212 | 0.191 | 0.259 | 0.256 | 0.285 | 0.250 | 0.203 |
| 11 | 0.181 | 0.150 | 0.195 | 0.192 | 0.238 | 0.219 | 0.177 |
| 12 | 0.144 | 0.082 | 0.137 | 0.107 | 0.187 | 0.187 | 0.157 |
| 13 | 0.075 | -0.5 | -5.00E-01 | -0.5 | 0.118 | 0.152 | 0.136 |
| 14 | -0.5 | -0.5 | -0.5 | -0.5 | 0.045 | 0.130 | 0.139 |
| 15 | -0.5 | -0.5 | -0.5 | -0.5 | -0.5 | 0.098 | 0.120 |
| 16 | -0.5 | -0.5 | -0.5 | -0.5 | 0.033 | 0.091 | 0.126 |
| 17 | -0.5 | -0.5 | -0.5 | -0.5 | 0.053 | 0.109 | 0.155 |
| 18 | -0.5 | -0.5 | -0.5 | -0.5 | 0.034 | 0.099 | 0.155 |
| 19 | -0.5 | -0.5 | -0.5 | -0.5 | 0.018 | 0.074 | 1.26E-01 |

Fig. 52

|    | 1     | 2     | 3     | 4     | 5     | 6     | 7       |
|----|-------|-------|-------|-------|-------|-------|---------|
| 1  | 0.355 | 0.326 | 0.288 | 0.224 | 0.181 | 0.208 | 0.278   |
| 2  | 0.340 | 0.326 | 0.282 | 0.216 | 0.179 | 0.209 | 0.288   |
| 3  | 0.311 | 0.304 | 0.256 | 0.190 | 0.165 | 0.205 | 0.284   |
| 4  | 0.263 | 0.268 | 0.226 | 0.179 | 0.174 | 0.199 | 0.256   |
| 5  | 0.188 | 0.215 | 0.202 | 0.179 | 0.181 | 0.183 | 0.213   |
| 6  | 0.076 | 0.169 | 0.175 | 0.186 | 0.182 | 0.152 | 0.138   |
| 7  | -0.5  | 0.095 | 0.139 | 0.191 | 0.183 | 0.127 | 0.063   |
| 8  | -0.5  | -0.5  | 0.114 | 0.180 | 0.177 | 0.126 | 0.051   |
| 9  | -0.5  | -0.5  | 0.083 | 0.155 | 0.176 | 0.151 | 0.097   |
| 10 | -0.5  | -0.5  | 0.051 | 0.136 | 0.180 | 0.184 | 0.143   |
| 11 | -0.5  | -0.5  | 0.076 | 0.143 | 0.172 | 0.187 | 0.162   |
| 12 | -0.5  | 0.071 | 0.102 | 0.138 | 0.148 | 0.166 | 0.165   |
| 13 | -0.5  | 0.131 | 0.127 | 0.150 | 0.138 | 0.149 | 0.169   |
| 14 | 0.09  | 0.152 | 0.168 | 0.175 | 0.147 | 0.142 | 0.164   |
| 15 | 0.108 | 0.147 | 0.191 | 0.195 | 0.149 | 0.112 | 0.133   |
| 16 | 0.089 | 0.119 | 0.186 | 0.184 | 0.136 | 0.073 | 0.089   |
| 17 | 0.017 | 0.043 | 0.156 | 0.154 | 0.116 | -0.5  | -0.5    |
| 18 | -0.5  | -0.5  | 0.111 | 0.112 | 0.075 | -0.5  | -0.5    |
| 19 | -0.5  | -0.5  | 0.041 | 0.04  | -0.5  | -0.5  | 7.33E-03|
| 20 | -0.5  | -0.5  | -0.5  | -0.5  | -0.5  | 0.028 | 0.065   |

US 7,605,847 B2

DIGITAL CAMERA HAVING SUBJECT JUDGMENT FUNCTION

BACKGROUND OF THE INVENTION

The present invention relates to a subject judgment program for letting a computer, microprocessor, etc. function as a judging device that judges the type of a subject in an image formed by image data. The invention also relates to a digital camera which employs the subject judgment function to control an image capturing process and/or a quality correction process for correcting image data obtained or to be obtained by shooting a subject in accordance with the type of the subject.

As is commonly known, image data for displaying an image of a subject is generated when the subject is shot by a digital camera or when a positive/negative image containing the subject is read by a scanner, and the brightness, sharpness, color, etc. of the image formed by the image data can be changed by executing mathematical operations to the image data. Therefore, even when the quality of the image is not fine due to the settings/characteristics of the digital camera/scanner or the lighting on the subject, the image quality can be corrected easily only by executing proper computation to the image data.

Image processing software installed in digital cameras in recent years generally has such an image quality correction function. However, users having little experience in image quality correction do not understand which type of image quality correction process should be applied to the image data depending on the type of the subject in the image. Therefore, some of the many types of image processing software have the function of judging the type of the subject in the image formed by the image data in order to automatically execute the image quality correction during shooting or to inform the operator (user) of the type of the subject so that the operator can confirm the judgment is made correctly. An example of such process is described in Japanese Patent Provisional Publication No. 2003-018453.

However, the conventional image processing software described above is configured to judge the type of the subject based on setting/operational information obtained from each device in the digital camera such as a distance to the subject and a focal length and magnification of the lens used for shooting. Such a judgment may not be reliably correct since various subjects can be photographed at various operational settings.

It may be possible to introduce a so-called "matching technique" as a method for correctly judging the subject in the image. In this case, a lot of pieces of image data (images) of a variety of subjects are prepared as reference image data (reference images), and when image data of a subject image (as the target of image quality correction) is input, characteristic values of the subject image are compared with those of each reference image to obtain a difference regarding the characteristic values, and one of the reference images giving the smallest difference is identified. By such a process, the subject in the subject image is judged to be identical with the subject in the identified reference image.

In such a conventional method, in order to make the judgment as correct as possible, a large number of pieces of reference image data (reference images) may be prepared, and comparison of the input image and each of the reference images should be performed precisely.

However, digital cameras (especially, compact digital cameras) have certain limitations in storage capacity and processing speed for the image processing. Therefore, if the conventional matching process is performed, it takes a very long time for judgment, keeping the operator waiting for the completion of the judgment on the subject in the image. If the waiting time is shortened, the results may be unreliable.

SUMMARY OF THE INVENTION

The present invention is advantageous in that a subject judgment program is provided, which is capable of reducing the load on a computer, microprocessor, etc. functioning as the device for judging the type of the subject in the subject image, and a digital camera capable of controlling an image capturing process and/or the image quality correction process quickly with the precise judgment of the type of the subject.

According to an aspect of the invention, there is provided a computer program product comprising computer-readable instructions that cause a computer to function as a storage module which stores at least one piece of reference image data in a storage device associated with subject information which defines a subject in an image represented by the reference image data, an input module to which subject image data is input, a distribution data generation module which generates two-dimensional distribution data of product-moment correlation coefficients for at least one piece of reference image data stored in the storage device by calculating the product-moment correlation coefficients between the at least one reference image data and parts of the subject image data, an identification module which identifies a piece of two-dimensional distribution data having a value greater than a predetermined value, and an output module which reads out the subject information associated with the reference image data corresponding to the identified two-dimensional distribution data from the storage device and which outputs the subject information.

In accordance with another aspect of the present invention, there is provided a computer program product comprising computer-readable instructions that cause a computer to function as a storage module which stores one or more pieces of reference image data in a storage device associating each reference image data with subject information which defines a subject in an image formed by the reference image data, an input module to which subject image data is input, a distribution data generation module which generates two-dimensional distribution data of product-moment correlation coefficients for each of the one or more pieces of reference image data stored in the storage device by calculating the product-moment correlation coefficients between each reference image data and parts of the subject image data, an identification module which identifies a piece of two-dimensional distribution data having the highest maximum value among all the two-dimensional distribution data generated for all the reference image data, and an output module which reads out the subject information associated with the reference image data corresponding to the identified two-dimensional distribution data from the storage device and which outputs the subject information.

Preferably, the distribution data generation module includes a color space conversion module which converts color space of the subject image data into YCrCb while converting color space of all the reference image data stored in the storage device into YCrCb, a coefficient calculation module which calculates product-moment correlation coefficients between Cr components of each reference image data and parts of Cr components of the subject image data and thereby generates two-dimensional distribution data of the product-moment correlation coefficients regarding the Cr components for each reference image data, and which calculates product-moment correlation coefficients between Cb components of each reference image data and parts of Cb components of the subject image data and thereby generates two-dimensional distribution data of the product-moment correlation coefficients regarding the Cb components for each reference image data, and an average calculation module which executes an average calculation process, for calculating each geometric average of the product-moment correlation coefficients regarding the Cr and cb components at the same two-dimensional coordinates, for each reference image data and thereby generates two-dimensional distribution data of the geometric averages for each reference image data. In this case, the identification module identifies a piece of two-dimensional distribution data of geometric averages having the highest maximum value among all the two-dimensional distribution data of geometric averages generated for all the reference image data.

In accordance with another aspect of the present invention, there is provided a digital camera provided with a storage unit which stores one or more pieces of reference image data associating each reference image data with subject information which defines a subject in an image formed by the reference image data, an image pickup device which picks up a subject image formed by an objective optical system and thereby successively generates subject image data, an image processing unit which changes image quality of an image displayed on a display device according to the subject image data by executing computation to the subject image data using proper correction values, a distribution data generation unit which generates two-dimensional distribution data of product-moment correlation coefficients for each of the one or more pieces of reference image data stored in the storage unit by calculating the product-moment correlation coefficients between each reference image data and parts of the subject image data, an identification unit which identifies a piece of two-dimensional distribution data having the highest maximum value among all the two-dimensional distribution data generated for all the reference image data, a readout unit which reads out the subject information associated with the reference image data corresponding to the identified two-dimensional distribution data from the storage unit, and a setting alteration unit which alters the correction values used by the image processing unit into correction values corresponding to the subject information read out by the readout unit.

According to another aspect of the invention, there is provided a method of identifying a type of a subject image, which includes (a) preparing a plurality of pieces of reference image data respectively representing a plurality of different types of images, the number of pixels of the subject image data being different from the number of pixels of each of the reference image data, (b) scanning, of a piece of reference image data and subject image data, the data having the lower number of pixels within the other of the piece of reference image data and the subject image data to evaluate similarity therebetween at every predetermined scanning position to obtain two dimensional distribution data, the scanning being repeated for each of the plurality of pieces of reference image data to obtain the two dimensional distribution data for each of the plurality of pieces of the reference image data, and (c) identifying one of the plurality of pieces of the reference image data most similar to the subject image in accordance with the plurality of pieces of the two dimensional distribution data corresponding to the plurality of pieces of the reference image data.

In a particular case, the number of the pixels of each piece of the reference image data is smaller than the number of the pixels of the subject image data.

Optionally, the numbers of the pixels of the plurality of pieces of the reference image data may be the same.

Still optionally, the preparing may include generating each of the plurality of pieces of the reference image data by reducing the number of pixels of a plurality of pieces of predetermined model image data.

Further, the preparing may include reducing the number of pixels of an object image to generate the subject image.

Still optionally, the identifying may identify one of the plurality of pieces of the reference image data which corresponds to the two-dimensional distribution data having the highest maximum value of any two-dimensional distribution data as the reference image data corresponding to the subject image.

BRIEF DESCRIPTION OF THE ACCOMPANYING DRAWINGS

Figure 2:
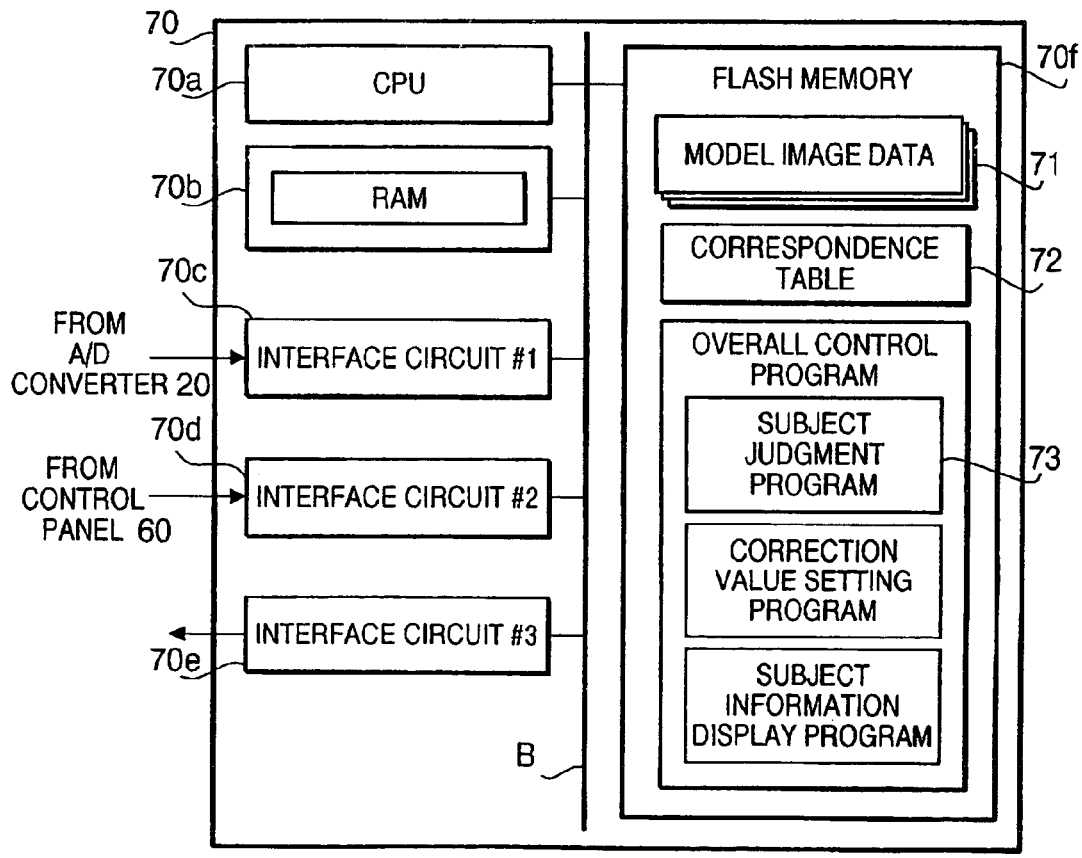
Figure 4:
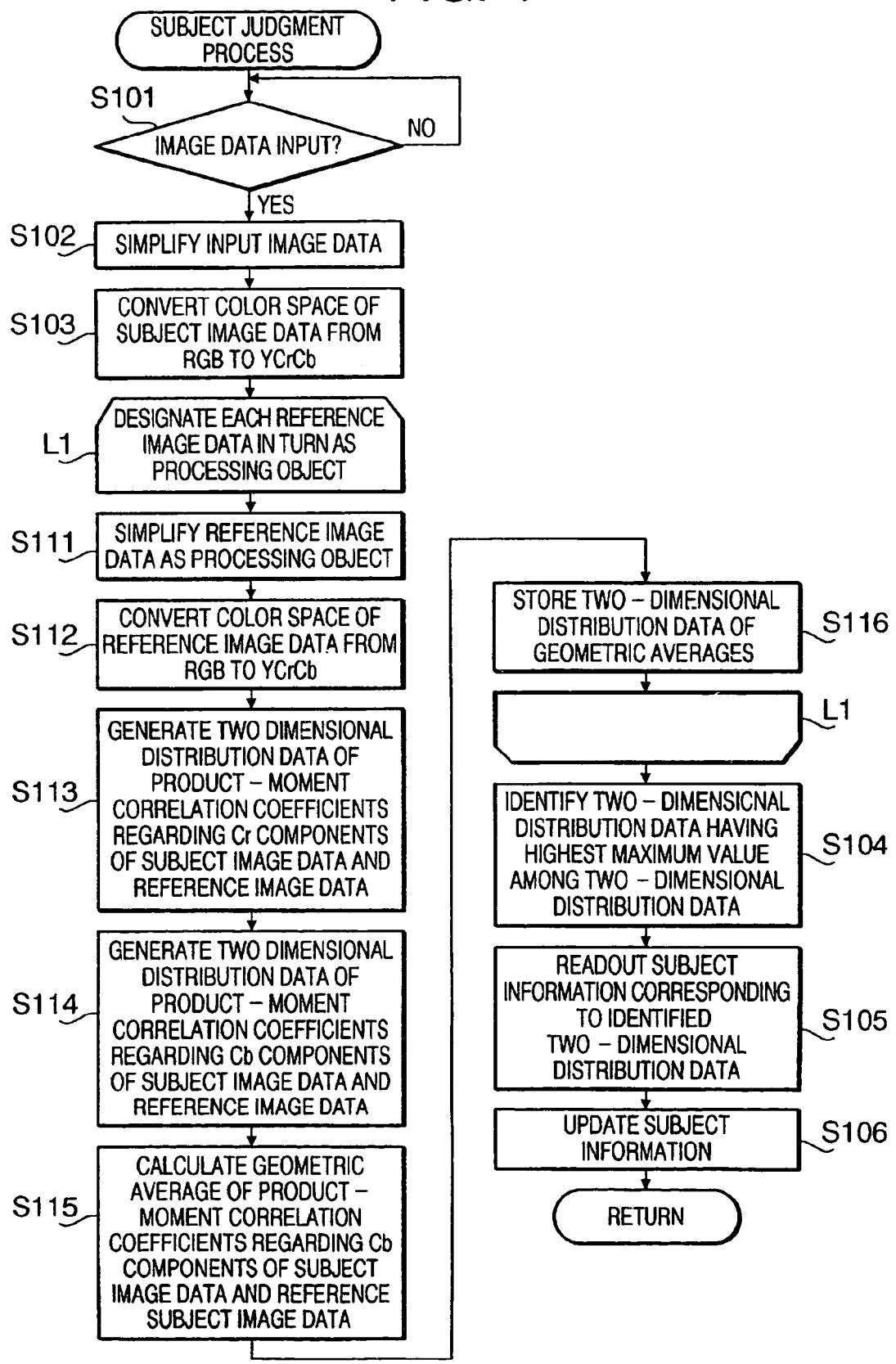
Figure 5:
Figure 6:
Figure 10:
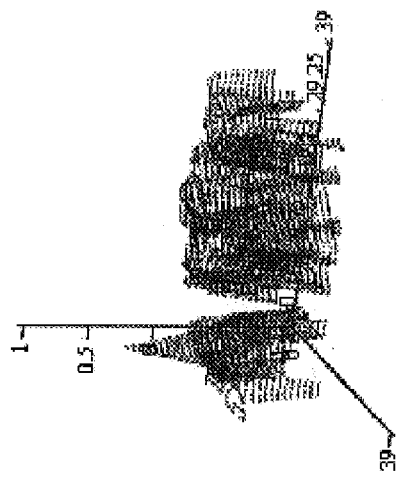
Figure 8:
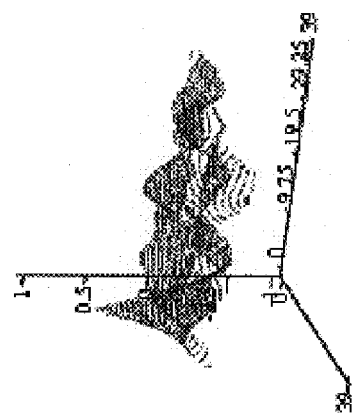
Figure 7:
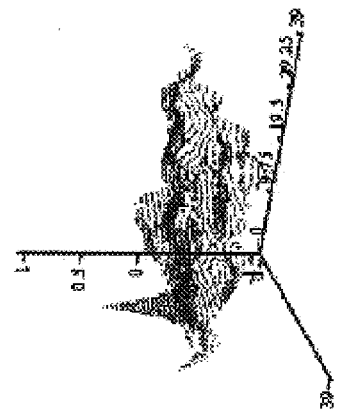
Figure 11:
Figure 15:
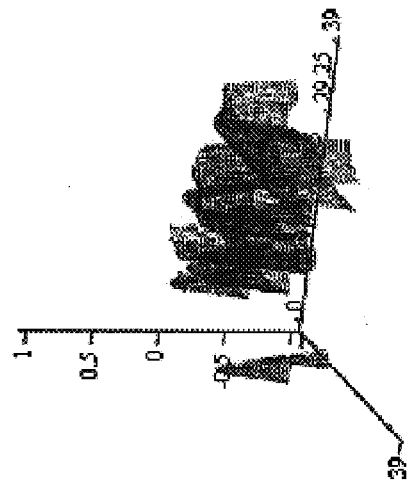
Figure 13:
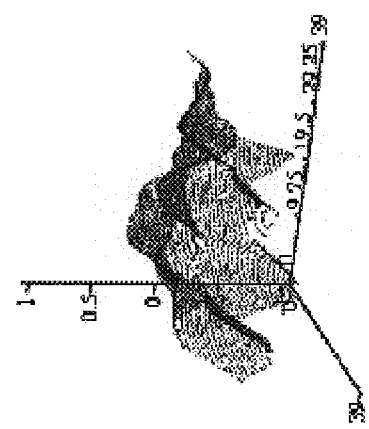
Figure 12:
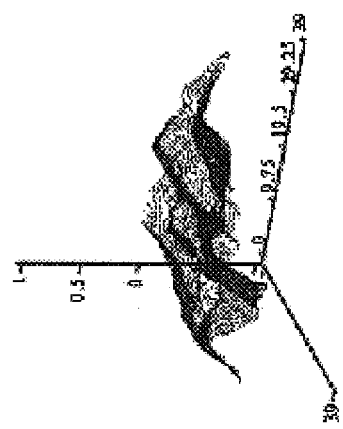
Figure 16:
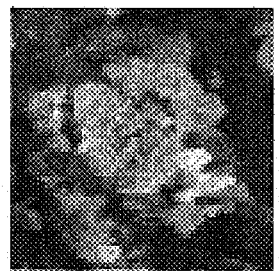
Figure 21:
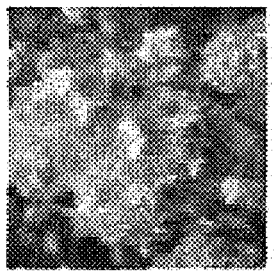
Figure 25:
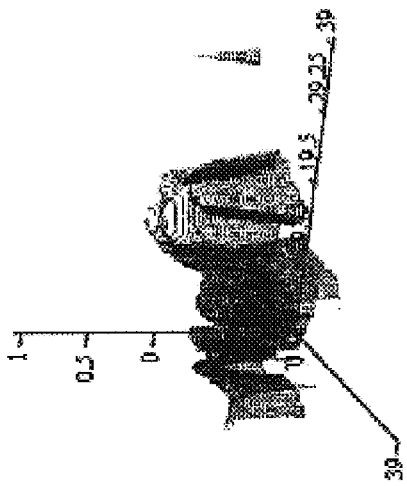
Figure 23:
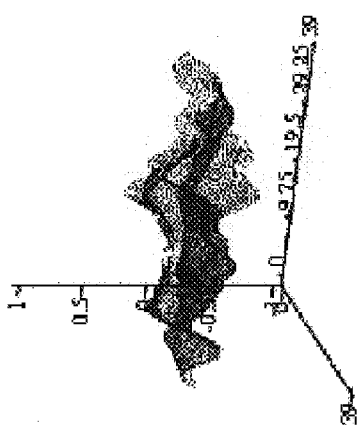
Figure 22:
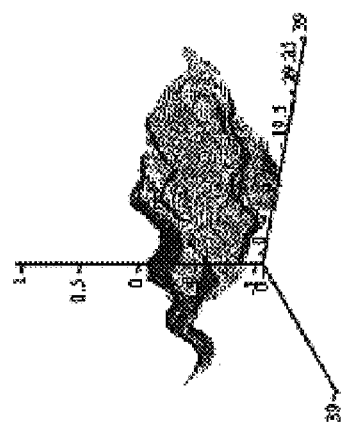
Figure 26:
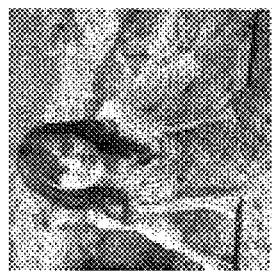
Figure 27:
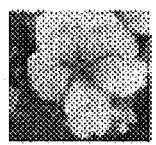
Figure 32:
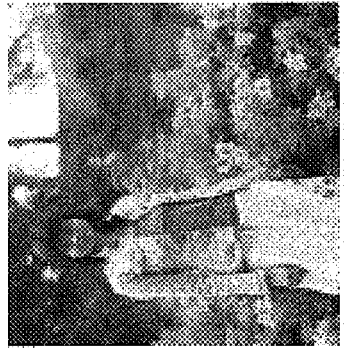
Figure 33:
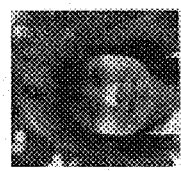
Figure 37:
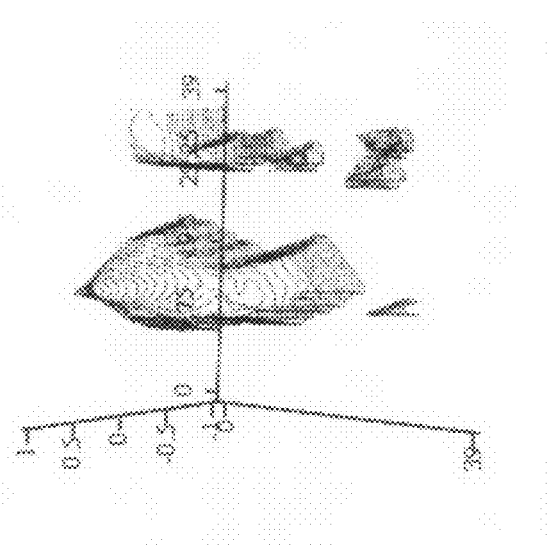
Figure 35:
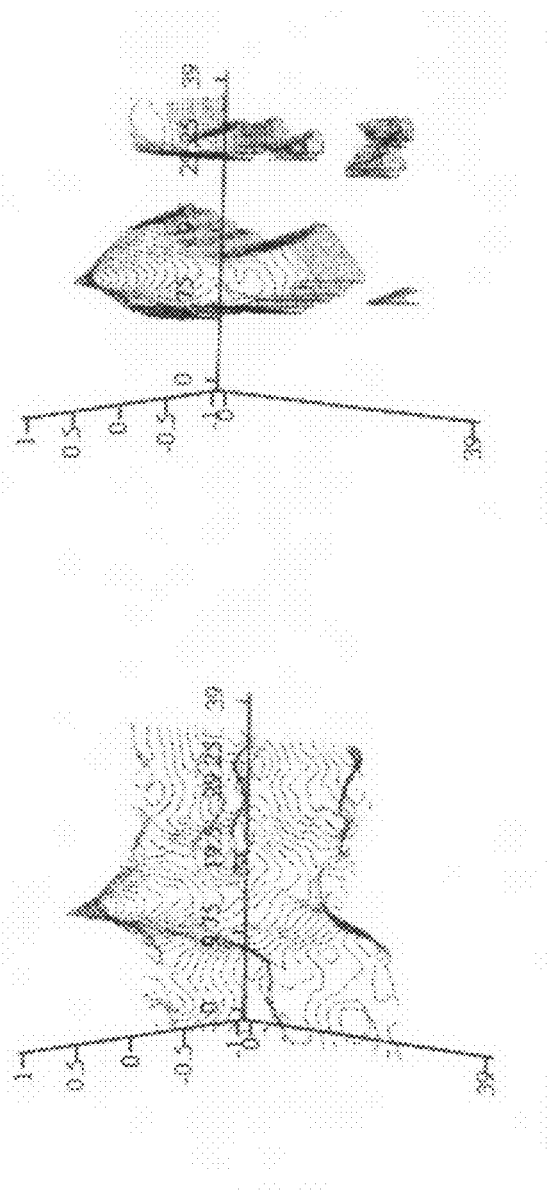
Figure 34:
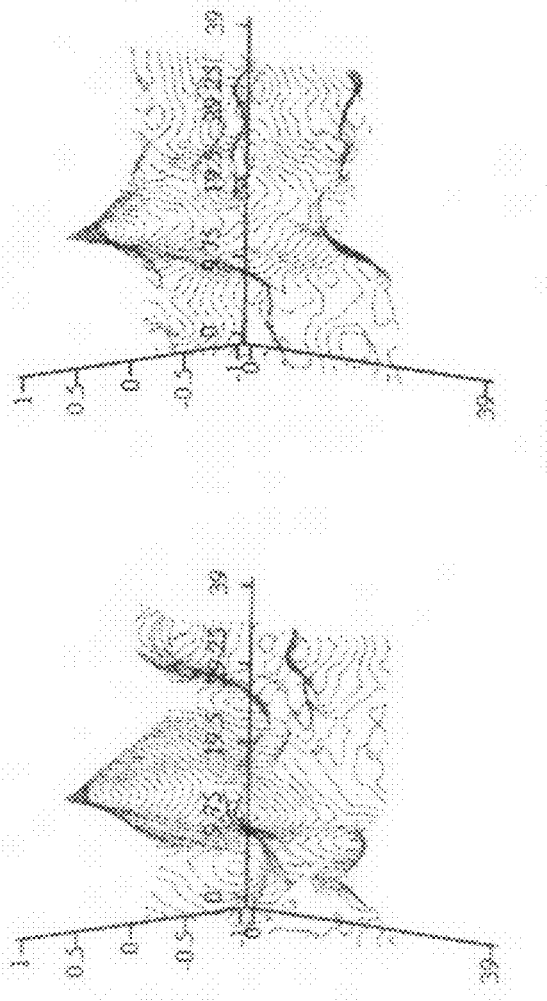
Figure 38:
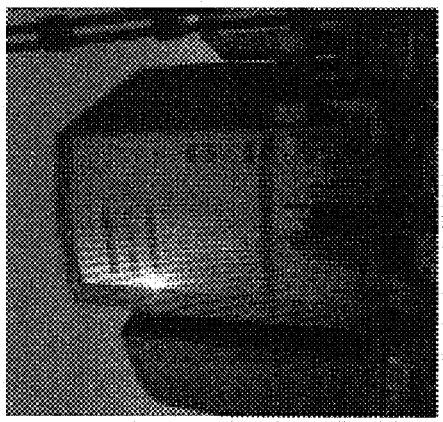
Figure 42:
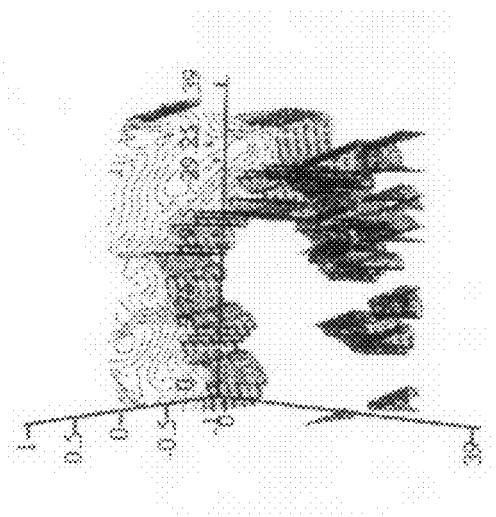
Figure 40:
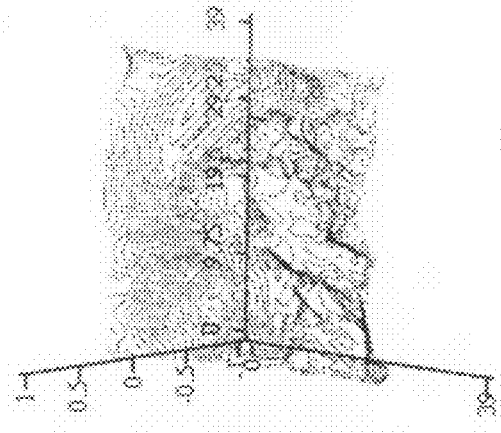
Figure 39:
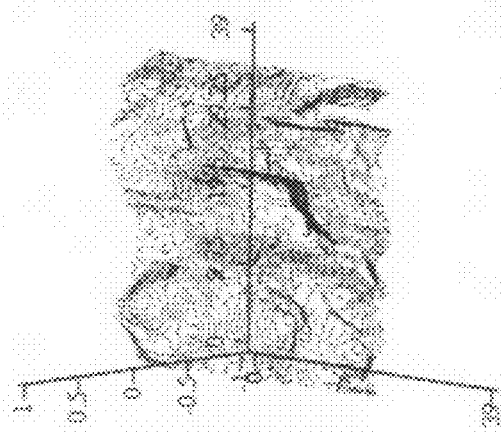
Figure 43:
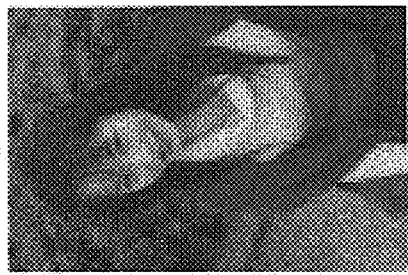
Figure 47:
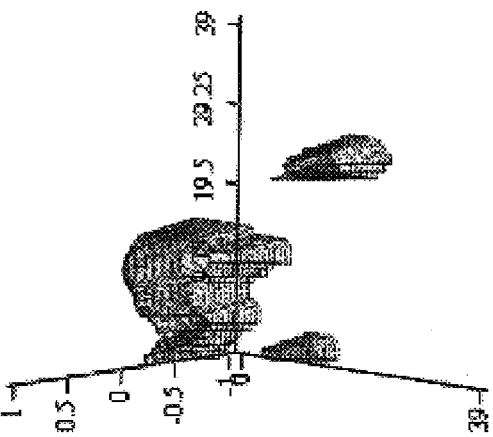
Figure 45:
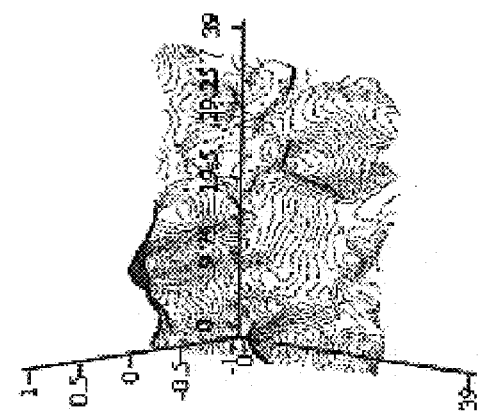
Figure 44:
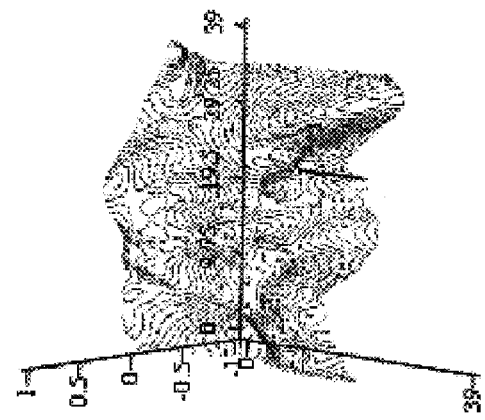
Figure 48:
Figure 49:
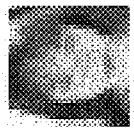
Figure 53:
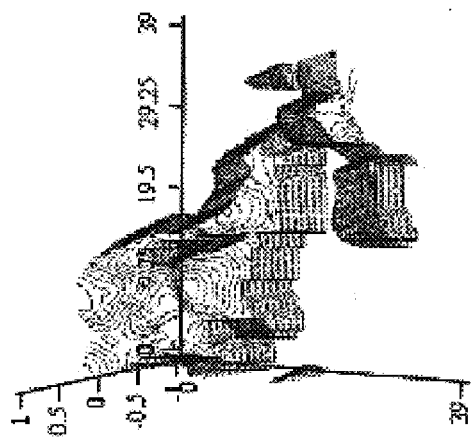
Figure 51:
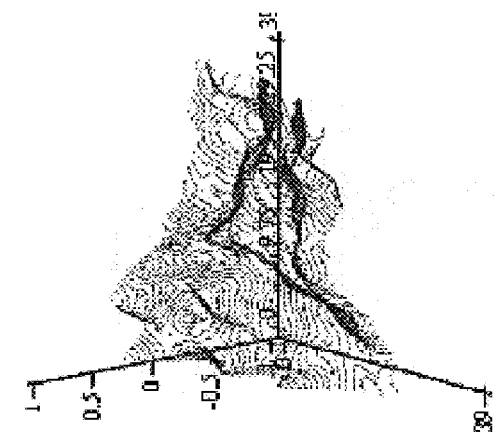
Figure 50:
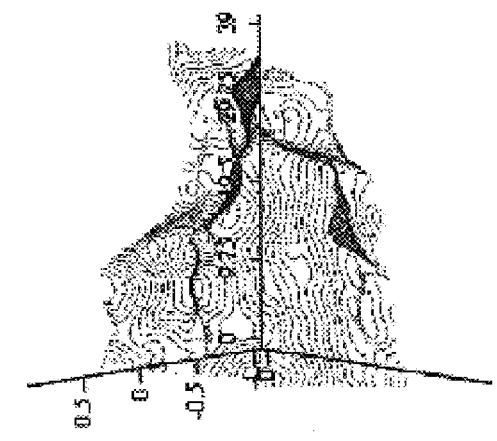
Figure 54:
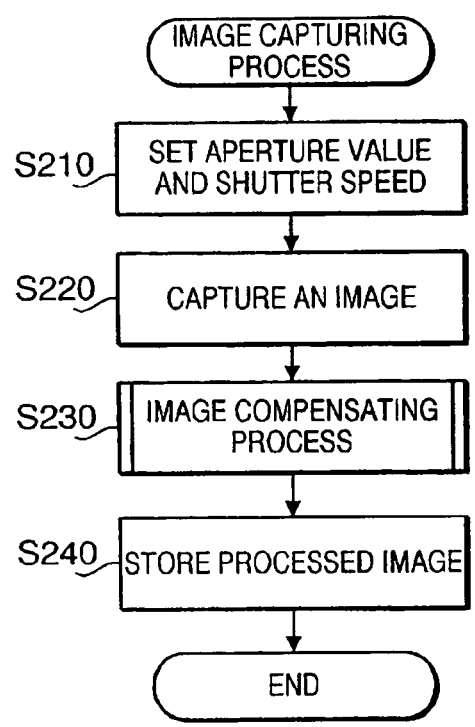
Figure 55:
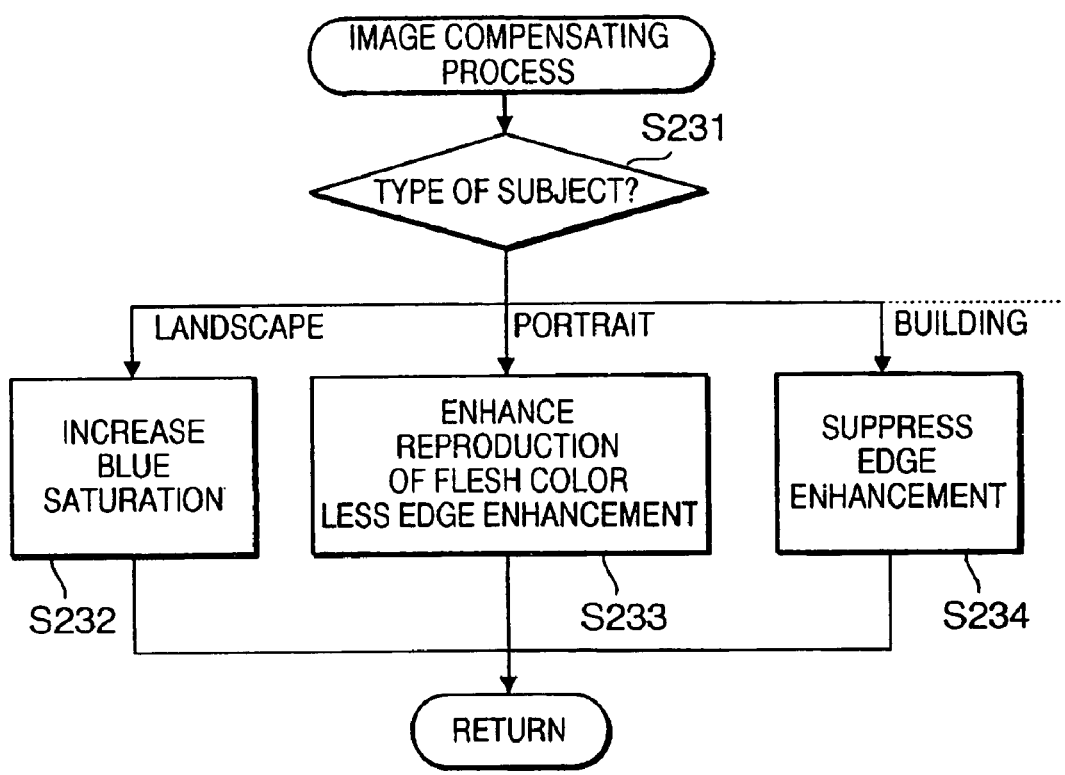

FIG. 1 is a block diagram schematically showing the internal composition of a digital still camera in accordance with an embodiment of the present invention, FIG. 2 is a block diagram schematically showing functional blocks of a controller of the digital still camera, FIG. 3 is a data structure table for conceptually explaining a correspondence table of the digital still camera, FIG. 4 is a flow chart explaining the contents of a subject judgment process, FIG. 5 shows a subject image in a first example of the embodiment, FIG. 6 shows a reference image in the first example, FIG. 7 is a three-dimensional graph of product-moment correlation coefficients regarding Cr components in the first example, FIG. 8 is a three-dimensional graph of product-moment correlation coefficients regarding Cb components in the first example, FIG. 9 is a table showing a geometric average of the product-moment correlation coefficients at each point of two-dimensional coordinates in the first example, FIG. 10 is a three-dimensional graph of the geometric averages in the first example, FIG. 11 shows a subject image in a second example of the embodiment, FIG. 12 is a three-dimensional graph of product-moment correlation coefficients regarding Cr components in the second example, FIG. 13 is a three-dimensional graph of product-moment correlation coefficients regarding Cb components in the second example, FIG. 14 is a table showing a geometric average of the product-moment correlation coefficients at each point of two-dimensional coordinates in the second example, FIG. 15 is a three-dimensional graph of the geometric averages in the second example, FIG. 16 shows a subject image in a third example of the embodiment, FIG. 17 is a three-dimensional graph of product-moment correlation coefficients regarding Cr components in the third example, FIG. 18 is a three-dimensional graph of product-moment correlation coefficients regarding Cb components in the third example, FIG. 19 is a table showing a geometric average of the product-moment correlation coefficients at each point of two-dimensional coordinates in the third example, FIG. 20 is a three-dimensional graph of the geometric averages in the third example, FIG. 21 shows a subject image in a fourth example of the embodiment, FIG. 22 is a three-dimensional graph of product-moment correlation coefficients regarding Cr components in the fourth example, FIG. 23 is a three-dimensional graph of product-moment correlation coefficients regarding Cb components in the fourth example, FIG. 24 is a table showing a geometric average of the product-moment correlation coefficients at each point of two-dimensional coordinates in the fourth example, FIG. 25 is a three-dimensional graph of the geometric averages in the fourth example, FIG. 26 shows a subject image in a fifth example of the embodiment, FIG. 27 shows a reference image in the fifth example, FIG. 28 is a three-dimensional graph of product-moment correlation coefficients regarding Cr components in the fifth example, FIG. 29 is a three-dimensional graph of product-moment correlation coefficients regarding Cb components in the fifth example, FIG. 30 is a table showing a geometric average of the product-moment correlation coefficients at each point of two-dimensional coordinates in the fifth example, FIG. 31 is a three-dimensional graph of the geometric averages in the fifth example, FIG. 32 shows a subject image in a sixth example of the embodiment, FIG. 33 shows a reference image in the sixth example, FIG. 34 is a three-dimensional graph of product-moment correlation coefficients regarding Cr components in the sixth example, FIG. 35 is a three-dimensional graph of product-moment correlation coefficients regarding Cb components in the sixth example, FIG. 36 is a table showing a geometric average of the product-moment correlation coefficients at each point of two-dimensional coordinates in the sixth example, FIG. 37 is a three-dimensional graph of the geometric averages in the sixth example, FIG. 38 shows a subject image in a seventh example of the embodiment, FIG. 39 is a three-dimensional graph of product-moment correlation coefficients regarding Cr components in the seventh example, FIG. 40 is a three-dimensional graph of product-moment correlation coefficients regarding Cb components in the seventh example, FIG. 41 is a table showing a geometric average of the product-moment correlation coefficients at each point of two-dimensional coordinates in the seventh example, FIG. 42 is a three-dimensional graph of the geometric averages in the seventh example, FIG. 43 shows a subject image in an eighth example of the embodiment, FIG. 44 is a three-dimensional graph of product-moment correlation coefficients regarding Cr components in the eighth example, FIG. 45 is a three-dimensional graph of product-moment correlation coefficients regarding Cb components in the eighth example, FIG. 46 is a table showing a geometric average of the product-moment correlation coefficients at each point of two-dimensional coordinates in the eighth example, FIG. 47 is a three-dimensional graph of the geometric averages in the eighth example, FIG. 48 shows a subject image in a ninth example of the embodiment, FIG. 49 shows a reference image in the ninth example, FIG. 50 is a three-dimensional graph of product-moment correlation coefficients regarding Cr components in the ninth example, FIG. 51 is a three-dimensional graph of product-moment correlation coefficients regarding Cb components in the ninth example, FIG. 52 is a table showing a geometric average of the product-moment correlation coefficients at each point of two-dimensional coordinates in the ninth example, FIG. 53 is a three-dimensional graph of the geometric averages in the ninth example, FIG. 54 is a flowchart illustrating an image capturing process which is executed when a shutter button of the camera is depressed, and FIG. 55 is a flowchart illustrating an image compensating procedure called in the image capturing process shown in FIG. 54.

DESCRIPTION OF THE EMBODIMENT

Referring now to the drawings, a description will be given in detail of preferred embodiment in accordance with the present invention.

FIG. 1 is a block diagram schematically showing the internal composition of a digital still camera in accordance with an embodiment of the present invention. The digital still camera includes an image pickup device 10, an A/D (analog-to-digital) converter 20, an image processor 30, a storage 40, a display 50, a control panel 60 and a controller 70 as main components.

The image pickup device 10 is a device for picking up a subject image (an image of a subject) which is formed by an objective optical system 11. The image pickup device 10 constantly outputs image data obtained by the image pickup operation. The A/D converter 20 is a device for successively converting the image data of an analog signal format outputted by the image pickup device 10 into image data of a digital signal format.

The image processor 30 is a device for executing prescribed image processing to the image data outputted by the A/D converter 20. The image processor 30 obtains the image data from the A/D converter 20 in response to an instruction from the controller 70 (explained later) and changes the image quality of the image formed by the image data by applying proper mathematical operations corresponding to information supplied from the controller 70 to the obtained image data.

The storage 40 is a memory for successively storing the image data outputted by the image processor 30. The display 50 is a device for displaying an image based on the image data outputted by the image processor 30.

The control panel 60 is provided with various switches, buttons and keys for operating the digital still camera, including a switch for turning on/off the main power, switches for changing the shooting mode, display mode, etc., a shutter button, a cross-shaped key and buttons for altering various settings, etc.

The controller 70 controls the whole digital still camera executes various processes in response to inputs by the operator to the switches, buttons and keys on the control panel 60. FIG. 2 is a block diagram schematically showing functional blocks of the controller 70.

The controller 70 includes a CPU 70a, a RAM 70b, a first interface circuit 70c, a second interface circuit 70d, a third interface circuit 70e and a flash memory 70f. The hardware components 70a-70f are connected together by a bus B.

The CPU 70a is a central processing unit for controlling the whole controller 70. The RAM 70b is a main memory in which work areas are reserved when various programs are run by the CPU 70a.

The first interface circuit 70c is a device in charge of the reception of the image data from the A/D converter 20. The A/D converter 20 constantly outputs the image data. The image data received by the first interface circuit 70c is successively transferred to the RAM 70b.

The second interface circuit 70d is a device in charge of the reception of information which is outputted by the control panel 60 when one or more of the switches, buttons and keys on the control panel 60 are operated.

The third interface circuit 70e is a device in charge of the transmission of information to the image processor 30. The information transmitted by the third interface circuit 70e to the image processor 30 is obtained by the CPU 70a by running a program which will be explained later.

The flash memory 70f is a storage device storing various programs and data. The flash memory 70f is detachably attached to a socket of a circuit board which is a main component of the controller 70. Thus, the flash memory 70f can be replaced with a new flash memory 70f storing various programs and data which have been upgraded, updated or modified to new versions. In this case, the flash memory 70f functions as an exchangeable and computer-readable record medium.

The data stored in the flash memory 70f include one or more pieces of model image data 71. The model image data 71 are image data of images of subjects such as a human figure, red leaves of autumn, flowers, ocean, sunset and buildings.

The model image data 71 may be image data generated by the digital still camera by shooting subjects and then stored in the flash memory 70f, image data input from another computer to the flash memory 70f via an unshown communication function of the digital still camera, or image data stored in the flash memory 70f when the digital still camera is manufactured and shipped from the factory.

The data stored in the flash memory 70f also include a correspondence table 72. The correspondence table 72 is a table storing the correspondence between each model image data 71 and each subject information defining the subject in the model image formed by the model image data 71. FIG. 3 is a data structure table for conceptually explaining the correspondence table 72.

As shown in FIG. 3, the correspondence table 72 stores each record which is uniquely associated with each model image data 71. Each record includes a "file name" field and a "subject information" field. The "file name" field stores the file name of the model image data 71, while the "subject information" field stores the subject information regarding the type of the subject.

The programs stored in the flash memory 70f include an overall control program for controlling the whole of the digital still camera. The overall control program includes a subject judgment program 73 in accordance with the present invention, a correction value setting program and a subject information display program, as its module programs.

The subject judgment program 73 is a program for letting the CPU 70a judge the subject in each image formed by each image data successively supplied from the A/D converter 20 to the controller 70 and thereby identify the subject information on the subject.

The correction value setting program is a program for letting the CPU 70a generate information for altering correction values regarding brightness, sharpness, color, etc. used by the image processor 30 into proper correction values corresponding to the subject information identified by the subject judgment program 73 and output the generated information to the image processor 30.

The subject information display program is a program for letting the CPU 70a generate image data for superimposing the subject information (identified by the subject judgment program 73) on the image displayed on the display 50 and send the generated image data to the display 50.

In the following, a process carried out by the controller 70 composed as above will be described in detail.

When the main power of the digital still camera is turned on by operating the main power switch of the control panel 60, the CPU 70a of the controller 70 reads the overall control program from the flash memory 70f and thereby starts controlling the whole digital still camera. When the operation mode of the digital still camera is switched to a shooting mode by operating the mode switch of the control panel 60, the CPU 70a reads the subject judgment program 73 from the flash memory 70f, by which a subject judgment process is started by the controller 70. FIG. 4 is a flowchart explaining the contents of the subject judgment process.

In the first step S101 of the subject judgment process, the CPU 70a waits until image data supplied from the A/D converter 20 is stored in the RAM 70b via the first interface circuit 70c. When image data of an image has been stored in the RAM 70b, the CPU 70a advances to step S102.

In the step S102, the CPU 70a simplifies the image data stored in the R 70b. According to the embodiment, the simplification executed in this step includes thinning out (omission) of data. It should be noted that other methods such as thumbnailing (scaling down), averaging, extraction of pixels satisfying specific conditions, etc. may be employed for simplification. However, the thinning out of data is advantageous since the simplified data retains the color of the original image.

By the simplification, the CPU 70a reduces the number of pixels of the image data from several millions to 32×32 or 64×64, for example. Such image data with a reduced number of pixels will hereinafter be called "subject image data". After generating the subject image data, the CPU 70a advances to step S103.

In the step S103, the CPU 70a converts the color space of the subject image data from RGB to YCrCb. Conceptually, the CPU 70a generates color tone values (Y, Cr, Cb) of each pixel of a new subject image data by substituting color tone values (R, G, B) of the pixel of the (old) subject image data into the following three equations:

$$Y=0.299R+0.587G+0.114B$$

$$Cr=0.701R-0.587G-0.114B$$

$$Cb=-0.299R-0.587G+0.886B$$

After the color space conversion of the step S103, the CPU 70a executes a process loop L1 with respect to each model image data 71 stored in the flash memory 70f.

In the process loop L1, the CPU 70a designates each model image data 71 in the flash memory 70f in turn as the object of the process and executes steps S111-S116 to each of the designated model image data 71 in sequence.

In the step S111, the CPU 70a simplifies the model image data 71 as the processing object. The simplification executed in this step is the same as the simplification in the step S102. By such simplification, the CPU 70a reduces the number of pixels of the model image data 71 to 10×10 or 20×20, for example. Such model image data with a reduced number of pixels will hereinafter be called "reference image data". After generating the reference image data, the CPU 70a advances to step S112.

In the step S112, the CPU 70a converts the color space of the reference image data from RGB to YCrCb. This process is the same as the process executed in the step S103. After the color space conversion, the CPU 70a advances to step S113.

In the step S113, the CPU 70a generates two-dimensional distribution data of product-moment correlation coefficients regarding the Cr components of the subject image data and the Cr components of the reference image data as the processing object.

For example, when the subject image data has 20×20 pixels and the reference image data has 10×10 pixels, the CPU 70a first designates or extracts an area having 10×10 pixels from the subject image data and calculates a product-moment correlation coefficient between the 10×10 pixels of the designated area and the reference image data having 10×10 pixels. Subsequently, the CPU 70a repeats the process for calculating the product-moment correlation coefficient for all 10×10 pixel areas that can be extracted from the subject image data (allowing overlap between the areas). In this example, 11×11 product-moment correlation coefficients are obtained since 11×11 areas (having 10×10 pixels) can be extracted from the subject image data. Consequently, the CPU 70a generates two-dimensional distribution data having 11×11 product-moment correlation coefficients.

Incidentally, the "product-moment correlation coefficient" denotes a value for expressing the degree of correlation between a group X having n variables x and a group Y having n variables y. The product-moment correlation coefficient takes on values from −1 to 1. The method for calculating the product-moment correlation coefficient is well known in statistics. To describe the method briefly, the product-moment correlation coefficient γ is obtained by dividing the covariance of the variables x and y by the product of the standard deviation of the variables x and the standard deviation of the variables y, as shown in the following expression.

$$\gamma = \frac{\frac{1}{n-1}\sum_{i=1}^{n}(Xi-\overline{X})(Yi-\overline{Y})}{\sqrt{\frac{1}{n-1}\sum_{i=1}^{n}(Xi-\overline{X})^2 \cdot \frac{1}{n-1}\sum_{i=1}^{n}(Yi-\overline{Y})^2}}$$

After obtaining the two-dimensional distribution data of the product-moment correlation coefficients regarding the Cr components of the subject image data and the Cr components of the reference image data as the processing object in the step S113, the CPU 70a advances to step S114.

In the step S114, the CPU 70a generates two-dimensional distribution data of product-moment correlation coefficients regarding the Cb components of the subject image data and the Cb components of the reference image data as the processing object. The method for obtaining the two-dimensional distribution data in this step is similar to that in the step S113. After obtaining the two-dimensional distribution data regarding the Cb components, the CPU 70a advances to step S115.

In the step S115, the CPU 70a calculates the geometric average of two corresponding (at the same two-dimensional coordinates) product-moment correlation coefficients in the two-dimensional distribution data regarding the Cr and Cb components (that is, a product-moment correlation coefficient C1 in the two-dimensional distribution data regarding the Cr components and a product-moment correlation coefficient C2 in the two-dimensional distribution data regarding the Cb components at the same two-dimensional coordinates as the product-moment correlation coefficient C1). The CPU 70a generates two-dimensional distribution data of the geometric averages by executing the calculation of the geometric average for all the two-dimensional coordinates. For example, in the case where there are 11×11 product-moment correlation coefficients regarding the Cr components and 11×11 product-moment correlation coefficients regarding the Cb components, 11×11 geometric averages are calculated in the step S115. After obtaining the two-dimensional distribution data of the geometric averages, the CPU 70a advances to step S116.

In the step S116, the CPU 70a stores the two-dimensional distribution data of the geometric averages generated in the step S115 in the RAM 70b, associating the two-dimensional distribution data with the subject information corresponding to the model image data 71 as the processing object, and ends the process loop L1 for the processing object.

The CPU 70a repeats the above process loop L1 for all the model image data 71 existing in the flash memory 70f and thereby generates the two-dimensional distribution data of the geometric averages for all the model image data 71. After exiting from the process loop L1, the CPU 70a advances to step S104.

In the step S104, the CPU 70a identifies (selects) a piece of two-dimensional distribution data of geometric averages having the highest maximum value of geometric average among all the two-dimensional distribution data of geometric averages generated in the step S115 during the process loops L1 for all the model image data 71. Thereafter, the CPU 70a advances to step S105.

In the step S105, the CPU 70a reads out subject information corresponding to the two-dimensional distribution data of geometric averages identified in the step S104 (i.e. subject information corresponding to the model image data 71 from which the two-dimensional distribution data of geometric averages identified in the step S104 was obtained) from the correspondence table 72. Thereafter, the CPU 70a advances to step S106.

In the step S106, the CPU 70a overwrites subject information stored in a prescribed area of the RAM 70b with the subject information read out in the step S105 and thereby updates the subject information. After the update of the subject information, the CPU 70a ends the subject judgment process.

By the above subject judgment process executed by the controller 70, the subject information is successively identified based on the image data successively supplied from the A/D converter 20 regardless of whether it is during shooting or not, by which the subject information stored in the prescribed area of the RAM 70b is updated in succession.

When a shutter button of the control panel 60 is pressed under the above conditions, the correction value setting program is activated, by which the subject information existing in the prescribed area of the RAM 70b at the point in time is read out, information for altering the correction values used by the image processor 30 into proper correction values corresponding to the subject information is generated, and the generated information is supplied to the image processor 30. The image processor 30 supplied with the information carries out an image quality correction process to the image data obtained from the A/D converter 20 during shooting, based on the correction values specified by the information.

In short, the subject is correctly identified and proper correction values corresponding to the type of the subject are set to the image processor 30 before the operator of the digital still camera presses the shutter button. Therefore, a proper image quality correction process corresponding to the type of the subject is executed quickly to the generated image data even when a variety of subjects are shot by the operator. Consequently, the operator is released from the need of waiting for a long time from the pressing of the shutter button (generation of the image data) to the storage of the image data in the storage 40.

Meanwhile, when the subject information stored in the prescribed area of the RAM 70b is successively updated by the above subject judgment process, the CPU 70a under the subject information display program generates information for superimposing the subject information on the image displayed on the display 50, by which the image with the subject information superposed thereon is displayed on the display 50.

Therefore, the operator can let the display 50 indicate the subject information corresponding to the subject only by aiming the digital still camera at the subject before pressing the shutter button on the control panel 60, by which the operator is allowed to easily grasp the type of the image quality correction process which is going to be executed to the subject to be shot.

Even when the correction values have to be set to the image processor 30 manually by the operator (with no automatic setting by the controller 70), the operator can see the subject information indicated on the display 50 and thereby learn which type of image quality correction should be done.

Incidentally, while the subject judgment program 73 is incorporated in the overall control program of the digital still camera in the above embodiment, the program in which the subject judgment program 73 can be incorporated is not limited to the overall control program of the digital still camera. For example, the subject judgment program 73 may be incorporated in image processing software that is installed in a personal computer. Also in such image processing software, by activating the subject judgment program 73, the subject information regarding a subject in an image of arbitrary image data can be presented to the user when the user is about to apply an image quality correction process to the image data. Therefore, the user can learn which type of image quality correction should be done based on the presented subject information.

In such cases, the subject judgment program 73 may be stored in a record medium (floppy disk, CD-ROM, DVD-ROM, etc.) and supplied to the personal computer to be read out and run by the personal computer. The subject judgment program 73 may also be supplied to the personal computer via a communication network such as the Internet. In the case where the subject judgment program 73 is installed in a digital still camera, the subject judgment program 73 may either be stored in the flash memory 70f (record medium) when the digital still camera is manufactured and shipped from the factory or supplied to the digital still camera afterward via a record medium (Compact Flash, Smart Media, Memory Stick, etc.). The image data may also be input from an other computer to the flash memory 70f via the unshown communication function of the digital still camera.

In the following, nine concrete examples of the two-dimensional distribution data of geometric averages, actually calculated and generated by the above subject judgment process, will be presented.

FIG. 5 shows a subject image in a first example of the embodiment, and FIG. 6 shows a reference image in the first example. In the first example shown in FIGS. 5 and 6, the subject matter of the subject image is the whole of a pale purple hydrangea at the tip of a spray, and the reference image is an image obtained by directly cutting out a part containing a few calyxes from the subject image. The number of pixels of the subject image shown in FIG. 5 is 64×64 and that of the reference image shown in FIG. 6 is 24×24. It should be noted that, in FIGS. 5 and 6 and other drawings, each image formed thereon consists of more pixels than the actual number of pixels for explanation purpose (i.e., in order to clearly show the object of each image).

FIG. 7 is a three-dimensional graph generated based on the two-dimensional distribution data of product-moment correlation coefficients regarding the Cr components of the subject image of FIG. 5 and the reference image of FIG. 6. FIG. 8 is a three-dimensional graph generated based on the two-dimensional distribution data of product-moment correlation coefficients regarding the Cb components of the subject image of FIG. 5 and the reference image of FIG. 6.

FIG. 9 is a table generated based on the two-dimensional distribution data regarding the Cr components and the two-dimensional distribution data regarding the Cb components, showing the geometric average of the product-moment correlation coefficients at each point in the two-dimensional coordinates. FIG. 10 is a three-dimensional graph generated based on the two-dimensional distribution data of the geometric averages.

Incidentally, in FIGS. 7 through 10, negative correlation coefficients and geometric averages obtained from the negative correlation coefficients are rounded to −0.5 for reducing the load of calculation and facilitating the drawing of the graphs. While the table showing the two-dimensional distribution of the geometric averages should have 41×41 cells statistically, only 11×11 cells containing a characteristic part of the two-dimensional distribution are shown in FIG. 9 due to limitations of space.

As shown in FIGS. 9 and 10, the maximum geometric average is 0.997 in the two-dimensional distribution of geometric averages in the first example. In other words, the two-dimensional distribution shows that the part of the subject image at the position with the maximum geometric average has an extremely high correlation with the reference image. Since the part of the subject image has exactly the same contents as the reference image, it can be said that the two-dimensional distribution of geometric averages is effectively serving as data properly representing the correlation between the subject image and the reference image.

FIG. 11 shows a subject image in a second example of the embodiment. In the second example, the subject matter of the subject image is a close-up of a pistil/stamen part of a red flower, and the reference image is the same as that of the first example (see FIG. 6). The number of pixels of the subject image shown in FIG. 11 is 64×64 similarly to the first example.

FIG. 12 is a three-dimensional graph of the product-moment correlation coefficients regarding the Cr components in the second example, and FIG. 13 is a three-dimensional graph of the product-moment correlation coefficients regarding the Cb components in the second example. FIG. 14 is a table showing the geometric average of the product-moment correlation coefficients at each point in the two-dimensional coordinates, and FIG. 15 is a three-dimensional graph of the geometric averages. Incidentally, also in FIGS. 12 through 15, negative correlation coefficients and geometric averages obtained therefrom are rounded to −0.5 for the same reason (reduction of the calculation load and facility of graph drawing on the negative side) as FIGS. 7 through 10. Also in the table of FIG. 14, only 11×11 cells containing a characteristic part of the two-dimensional distribution are shown out of the two-dimensional distribution table having 41×41 cells, for the same reason (limitations of space) as FIG. 9.

As shown in FIGS. 14 and 15, the maximum geometric average is 0.003 in the two-dimensional distribution of geometric averages in the second example. In other words, the two-dimensional distribution shows that no part of the subject image has any correlation with the reference image. Meanwhile, it is visually and intuitively obvious that there is almost no correlation between each part of the subject image and the reference image, since the subject image does not contain any color similar to that in the reference image and also does not contain anything having a similar shape to the calyx in the reference image (as is clear from the comparison between FIG. 11 and FIG. 6). Therefore, the two-dimensional distribution of geometric averages is effectively serving as data properly representing the correlation between the subject image and the reference image.

FIG. 16 shows a subject image in a third example of the embodiment. In the third example, the subject matter of the subject image is the whole of another pale purple hydrangea at the tip of another spray (different from that of the first example), and the reference image is the same as that of the first example (see FIG. 6). The number of pixels of the subject image shown in FIG. 16 is 64×64 similarly to the first example.

FIG. 17 is a three-dimensional graph of the product-moment correlation coefficients regarding the Cr components in the third example, and FIG. 18 is a three-dimensional graph of the product-moment correlation coefficients regarding the Cb components in the third example. FIG. 19 is a table showing the geometric average of the product-moment correlation coefficients at each point in the two-dimensional coordinates, and FIG. 20 is a three-dimensional graph of the geometric averages. Incidentally, also in FIGS. 17 through 20, negative correlation coefficients and geometric averages obtained therefrom are rounded to −0.5 for the aforementioned reason. Also in the table of FIG. 19, only 11×11 cells containing a characteristic part of the two-dimensional distribution are shown out of the two-dimensional distribution table having 41×41 cells for the aforementioned reason.

As shown in FIGS. 19 and 20, the maximum geometric average is 0.302 in the two-dimensional distribution of geometric averages in the third example. In other words, the two-dimensional distribution shows that the part of the subject image at the position with the maximum geometric average has a certain degree of correlation with the reference image. This is caused by the existence of a lot of colors in the subject image that are almost the same as those of the reference image.

FIG. 21 shows a subject image in a fourth example of the embodiment. In the fourth example, the subject matter of the subject image is the whole of still another pale purple hydrangea at the tip of still another spray (different from those of the first and third examples), and the reference image is the same as that of the first example (see FIG. 6). The number of pixels of the subject image shown in FIG. 21 is 64×64 similarly to the first example.

FIG. 22 is a three-dimensional graph of the product-moment correlation coefficients regarding the Cr components in the fourth example, and FIG. 23 is a three-dimensional graph of the product-moment correlation coefficients regarding the Cb components in the fourth example. FIG. 24 is a table showing the geometric average of the product-moment correlation coefficients at each point in the two-dimensional coordinates, and FIG. 25 is a three-dimensional graph of the geometric averages. Also in FIGS. 22 through 25, negative correlation coefficients and geometric averages obtained therefrom are rounded to −0.5. Also in the table of FIG. 24, only 11×11 cells containing a characteristic part of the two-dimensional distribution are shown out of the two-dimensional distribution table having 41×41 cells.

As shown in FIGS. 24 and 25, the maximum geometric average is 0.349 in the two-dimensional distribution of geometric averages in the fourth example. In other words, similarly to the third example, the two-dimensional distribution shows that the part of the subject image at the position with the maximum geometric average has a certain degree of correlation with the reference image. This is also caused by the existence of a lot of colors in the subject image that are almost the same as those of the reference image.

FIG. 26 shows a subject image in a fifth example of the embodiment, and FIG. 27 shows a reference image in the fifth example. In the fifth example, the subject matter of the subject image is the upper body of a person in pale pink clothes, and the subject matter of the reference image is a single flower which is pale magenta. The number of pixels of the subject image shown in FIG. 26 is 64×64 and that of the reference image shown in FIG. 27 is 24×24.

FIG. 28 is a three-dimensional graph of the product-moment correlation coefficients regarding the Cr components in the fifth example, and FIG. 29 is a three-dimensional graph of the product-moment correlation coefficients regarding the Cb components in the fifth example. FIG. 30 is a table showing the geometric average of the product-moment correlation coefficients at each point in the two-dimensional coordinates, and FIG. 31 is a three-dimensional graph of the geometric averages. Also in FIGS. 28 through 31, negative correlation coefficients and geometric averages obtained therefrom are rounded to −0.5. Also in the table of FIG. 30, only 11×11 cells containing a characteristic part of the two-dimensional distribution are shown out of the two-dimensional distribution table having 41×41 cells.

As shown in FIGS. 30 and 31, the maximum geometric average is 0.215 in the two-dimensional distribution of geometric averages in the fifth example. In other words, the two-dimensional distribution shows that the part of the subject image at the position with the maximum geometric average has little correlation with the reference image. This result indicates that the correlation does not get high enough only by the existence of colors in the subject image that are similar to those of the reference image.

FIG. 32 shows a subject image in a sixth example of the embodiment, and FIG. 33 shows a reference image in the sixth example. In the sixth example, the subject matter of the subject image is the upper body of a person, and the reference image is an image obtained by directly cutting out a part containing the face of the person from the subject image. The number of pixels of the subject image shown in FIG. 32 is 68×70 and that of the reference image shown in FIG. 33 is 34×30.

FIG. 34 is a three-dimensional graph of the product-moment correlation coefficients regarding the Cr components in the sixth example, and FIG. 35 is a three-dimensional graph of the product-moment correlation coefficients regarding the Cb components in the sixth example. FIG. 36 is a table showing the geometric average of the product-moment correlation coefficients at each point in the two-dimensional coordinates, and FIG. 37 is a three-dimensional graph of the geometric averages. Also in FIGS. 34 through 37, negative correlation coefficients and geometric averages obtained therefrom are rounded to −0.5. While the table showing the two-dimensional distribution of the geometric averages should have 35×41 cells statistically, only 17×9 cells containing a characteristic part of the two-dimensional distribution are shown in FIG. 36 due to limitations of space.

As shown in FIGS. 36 and 37, the maximum geometric average is 1.000 in the two-dimensional distribution of geometric averages in the sixth example. In other words, the two-dimensional distribution shows that the part of the subject image at the position with the maximum geometric average has an extremely high correlation with the reference image. Since the part of the subject image has exactly the same contents as the reference image, it can be said that the two-dimensional distribution of geometric averages is effectively serving as data properly representing the correlation between the subject image and the reference image.

FIG. 38 shows a subject image in a seventh example of the embodiment. In the seventh example, the subject matter of the subject image is modern buildings, and the reference image is the same as that of the sixth example (see FIG. 33). The number of pixels of the subject image shown in FIG. 38 is 88×84.

FIG. 39 is a three-dimensional graph of the product-moment correlation coefficients regarding the Cr components in the seventh example, and FIG. 40 is a three-dimensional graph of the product-moment correlation coefficients regarding the Cb components in the seventh example. FIG. 41 is a table showing the geometric average of the product-moment correlation coefficients at each point in the two-dimensional coordinates, and FIG. 42 is a three-dimensional graph of the geometric averages. Also in FIGS. 39 through 42, negative correlation coefficients and geometric averages obtained therefrom are rounded to −0.5. Also in the table of FIG. 41, only 24×8 cells containing a characteristic part of the two-dimensional distribution are shown out of the two-dimensional distribution table having 55×55 cells.

As shown in FIGS. 41 and 42, the maximum geometric average is 0.232 in the two-dimensional distribution of geometric averages in the seventh example. In other words, similarly to the fifth example, the two-dimensional distribution shows that the part of the subject image at the position with the maximum geometric average has little correlation with the reference image. This is caused by the fact that the subject image has almost no color that is the same as or similar to that in the reference image.

FIG. 43 shows a subject image in an eighth example of the embodiment. In the eighth example, the subject matter of the subject image is the upper body of another person (different from that of the sixth example), and the reference image is the same as that of the sixth example (see FIG. 33). The number of pixels of the subject image shown in FIG. 43 is 72×48.

FIG. 44 is a three-dimensional graph of the product-moment correlation coefficients regarding the Cr components in the eighth example, and FIG. 45 is a three-dimensional graph of the product-moment correlation coefficients regarding the Cb components in the eighth example. FIG. 46 is a table showing the geometric average of the product-moment correlation coefficients at each point in the two-dimensional coordinates, and FIG. 47 is a three-dimensional graph of the geometric averages. Also in FIGS. 44 through 47, negative correlation coefficients and geometric averages obtained therefrom are rounded to −0.5. Also in the table of FIG. 46, only 19×7 cells containing a characteristic part of the two-dimensional distribution are shown out of the two-dimensional distribution table having 39×19 cells.

As shown in FIGS. 46 and 47, the maximum geometric average is 0.315 in the two-dimensional distribution of geometric averages in the eighth example. In other words, the two-dimensional distribution shows that the part of the subject image at the position with the maximum geometric average has a certain degree of correlation with the reference image. This is caused by the similarity of color and shape between the two faces.

FIG. 48 shows a subject image in a ninth example of the embodiment, and FIG. 49 shows a reference image in the ninth example. In the ninth example, the subject matter of the subject image is the upper body of still another person (different from those of the sixth and eighth examples), and the reference image is an image obtained by directly cutting out a facial part of another image containing a person that is different from the aforementioned persons. The number of pixels of the subject image shown in FIG. 48 is 64×64 and that of the reference image shown in FIG. 49 is 24×24.

FIG. 50 is a three-dimensional graph of the product-moment correlation coefficients regarding the Cr components in the ninth example, and FIG. 51 is a three-dimensional graph of the product-moment correlation coefficients regarding the Cb components in the ninth example. FIG. 52 is a table showing the geometric average of the product-moment correlation coefficients at each point in the two-dimensional coordinates, and FIG. 53 is a three-dimensional graph of the geometric averages. Also in FIGS. 50 through 53, negative correlation coefficients and geometric averages obtained therefrom are rounded to −0.5. Also in the table of FIG. 52, only 20×7 cells containing a characteristic part of the two-dimensional distribution are shown out of the two-dimensional distribution table having 41×41 cells.

As shown in FIGS. 52 and 53, the maximum geometric average is 0.355 in the two-dimensional distribution of geometric averages in the ninth example. In other words, the two-dimensional distribution shows that the part of the subject image at the position with the maximum geometric average has a certain degree of correlation with the reference image. This is caused by the similarity of color and shape between the two faces, similarly to the eighth example.

As described above, even if the reference image data contains exactly a portion of the subject image data, the type of the subject can be correctly identified. Since the size of the images (reference image and the subject image) are relatively small, the comparison (evaluation) process can be executed within a relatively short period of time. According to experiments, when the subject image data has 64×64 pixels, and the reference image data has 20×20 pixels, the type of the subject can be identified precisely.

In the above embodiment, each model image is converted to a reference image having less size than the model image. However, depending on the performance of the CPU 70a, original size of the model image, the size of the subject image etc., the model image may be used as it is. In such a case, the "reference image data" in the foregoing description should be interpreted equal to the "model image data".

In the above-described embodiment, the reference image data has a lower number of pixels than the subject image data. This may be reversed and the type of the subject can also be identified correctly.

In the embodiment, all the model images are compared with the subject image to determine the type of the subject image. This may be modified so that only one or a predetermined number of model images are used to detect the type of the subject image.

Incidentally, while the image pickup device 10 has been assumed in the above embodiment to generate the image data constantly, the operation of the image pickup device 10 is not restricted to that in the above explanation. For example, the image pickup device 10 may also be configured to generate the image data only when the shutter button on the control panel 60 is pressed halfway or fully. In this case, the operator (user) can let the display 50 indicate the subject information corresponding to a subject that he/she hopes to shoot, only by aiming the digital still camera at the subject and pressing the shutter button halfway, by which the operator can easily learn which type of image quality correction is going to be executed to the subject to be shot.

The two-dimensional distribution data of product-moment correlation coefficients (or the two-dimensional distribution data of geometric averages) used in the above embodiment is information for judging the similarity between each part of the subject image data and each reference image data (or each model image data). By reducing the size (the number of pixels) of the reference image data (or model image data) as much as possible within the extent allowing the judgment of the similarity, the calculation load of the matching between the subject image data and the reference image data (or model image data) can be reduced. By the reduction of the calculation load, the subject information can be updated and the settings for the image quality correction can be changed according to the subject information (the type of the subject) constantly, regardless of whether it is during shooting or not. Therefore, a proper image quality correction process depending on the type of the subject can be executed to the image data (obtained by shooting the subject) quickly.

In the above-described embodiment, for evaluating the similarity of the reference image data and the subject image data, the product-moment correlation coefficient γ is introduced. It should be appreciated that the evaluation method need not be limited to one employing the product-moment correlation coefficient, and various methods can be used alternatively or optionally. For example, the evaluation referring to a city-block distance, Euclid distance, weighted Euclid distance, Mahalanobis distance or a similar parameter can be used.

FIG. 54 is a flowchart illustrating an image capturing process which is executed when a shutter button of the camera is depressed, and FIG. 55 is a flowchart illustrating an image compensating procedure called in the image capturing process shown in FIG. 54.

The image capturing process is started when the shutter button (not shown) of the digital still camera is depressed. In S210, the CPU 70a retrieves the subject information stored in the prescribed area of the RAM 70b, and based on the subject information, the CPU 70a sets an aperture value and a shutter speed in accordance with the subject information.

In the embodiment, the correspondence between the subject information (i.e., a type of the subject) and the parameters (e.g., aperture value and shutter speed) are preliminarily determined. The correspondence may be modified/input by a user of the digital still camera.

In S220, in accordance with the aperture value and shutter speed set in S210, an image of the subject is captured and temporarily stored in a work area of the image processor 30.

In S230, the CPU 70a calls a subroutine, the image compensating process, which will be described referring to FIG. 55.

In this process, in accordance with the type of the subject stored and retrieved from the prescribed area of the RAM 70b, the captured image of the subject is processed.

For example, if the type of the subject is a "landscape", in S232, the saturation with respect blue components is increased. If the type of the subject is a "portrait", in S233, the color reproduction of flesh color is enhanced, and the edge enhancement is suppressed. If the type of the subject is a building, in S234, the edge enhancement is suppressed. If the type of the subject does not fall in one of the above, a default processing is applied to the image data.

It should be appreciated that the above processing of the image is only an example, and various modifications could be made. Further, although the image processing for the three types of subjects is described, the number/kind of types is not limited to the embodiment. Furthermore, the processing to be applied to the image data may be preliminary determined or set by the user of the digital camera.

After the image compensating process is completed, control returns to S240 of FIG. 54, at which the processed image is stored in the storage 50.

While the present invention has been described with reference to the particular illustrative embodiment, it is not to be restricted by the above exemplary embodiment but only by the appended claims. For example, while the description of the above embodiment has been given taking a digital still camera as an example, the present invention is also applicable to digital video cameras to achieve similar effects. It is to be appreciated that those skilled in the art can change or modify the embodiment without departing from the scope of the present invention.

The present disclosure relates to the subject matter contained in Japanese Patent Application No. 2003-366319, filed on Oct. 27, 2003, which is expressly incorporated herein by reference in its entirety.

What is claimed is:

1. A computer-accessible recording medium storing a program comprising computer-readable instructions that cause a computer to function as:

a storage module which stores a plurality of pieces of reference image data in a storage device associated with subject information defining subjects in images represented by the respective image data of the plurality of pieces of reference image data, an input module to which subject image data is input, a distribution data generation module which generates pieces of two-dimensional distribution data of product-moment correlation coefficients for each of the plurality of pieces of reference image data stored in the storage device by calculating the product-moment correlation coefficients between each of the plurality of pieces of reference image data and parts of the subject image data, an identification module which identifies a piece of two-dimensional distribution data having the highest maximum value among all the two-dimensional distribution data generated for all the pieces of the reference image data, and an output module which reads out the subject information associated with the reference image data corresponding to the identified pieces of two-dimensional distribution data from the storage device and which outputs the subject information, wherein:

the distribution data generation module includes:

a color space conversion module which converts color space of the subject image data into YCrCb while converting color space of all the reference image data stored in the storage device into YCrCb, a coefficient calculation module which calculates product-moment correlation coefficients between Cr components of each reference image data and parts of Cr components of the subject image data and thereby generates two-dimensional distribution data of the product-moment correlation coefficients regarding the Cr components for each reference image data, and which calculates product-moment correlation coefficients between Cb components of each reference image data and parts of Cb components of the subject image data and thereby generates two-dimensional distribution data of the product-moment correlation coefficients regarding the Cb components for each reference image data, and an average calculation module which executes an average calculation process, for calculating each geometric average of the product-moment correlation coefficients regarding the Cr and Cb components at the same two-dimensional coordinates, for each reference image data and thereby generates two-dimensional distribution data of the geometric averages for each reference image data, and wherein the identification module identifies a piece of two-dimensional distribution data of geometric averages having the highest maximum value among all the two-dimensional distribution data of geometric averages generated for all the reference image data.

2. A digital camera, comprising:

a storage unit which stores one or more pieces of reference image data associating each reference image data with subject information which defines a subject in an image formed by the pieces of reference image data, an image pickup device which picks up a subject image formed by an objective optical system and thereby successively generates subject image data, an image processing unit which changes image quality of an image displayed on a display device according to the subject image data by executing computation to the subject image data using proper correction values, a distribution data generation unit which generates pieces of two-dimensional distribution data of product-moment correlation coefficients for each of the one or more pieces of reference image data stored in the storage unit by calculating the product-moment correlation coefficients between each piece of reference image data and parts of the subject image data, an identification unit which identifies a piece of two-dimensional distribution data having the highest maximum value among all the two-dimensional distribution data generated for all the pieces of reference image data, a readout unit which reads out the subject information associated with the reference image data corresponding to the identified two-dimensional distribution data from the storage unit, and a setting alteration unit which alters the correction values used by the image processing unit into correction values corresponding to the subject information read out by the readout unit, wherein:

the distribution data generation unit includes:

a color space conversion module which converts color space of the subject image data into YCrCb while converting color space of all the reference image data stored in the storage unit into YCrCb, a coefficient calculation module which calculates product-moment correlation coefficients between Cr components of each reference image data and parts of Cr components of the subject image data and thereby generates two-dimensional distribution data of the product-moment correlation coefficients regarding the Cr components for each reference image data, and which calculates product-moment correlation coefficients between Cb components of each reference image data and parts of Cb components of the subject image data and thereby generates two-dimensional distribution data of the product-moment correlation coefficients regarding the Cb components for each reference image data, and an average calculation module which executes an average calculation process, for calculating each geometric average of the product-moment correlation coefficients regarding the Cr and Cb components at the same two-dimensional coordinates, for each reference image data and thereby generates two-dimensional distribution data of the geometric averages for each reference image data, and wherein the identification unit identifies a piece of two-dimensional distribution data of geometric averages having the highest maximum value among all the two-dimensional distribution data of geometric averages generated for all the reference image data.

3. A method of identifying a type of a subject image, comprising:

preparing a plurality of pieces of reference image data respectively representing a plurality of different types of images, a number of pixels of subject image data being different from a number of pixels of each of the pieces of reference image data;

scanning, of a piece of reference image data and subject image data, the piece of reference image data and the subject image data having a lower number of pixels, within the other of the piece of reference image data and the subject image data to evaluate similarity therebetween at every predetermined scanning position to obtain two dimensional distribution data from product-moment correlation coefficients between each of the pieces of reference image data and the subject image data at every predetermined scanning position, the scanning being repeated for each of the plurality of pieces of reference image data to obtain the two dimensional distribution data for each of the plurality of pieces of the reference image data;

identifying one of the plurality of pieces of the reference image data most similar to the subject image in accordance with the plurality of pieces of the two dimensional distribution data corresponding to the plurality of pieces of the reference image data;

converting color space of the subject image data into YCrCb while converting color space of all the reference image data into YCrCb;

calculating product-moment correlation coefficients between Cr components of each reference image data and parts of Cr components of the subject image data and thereby generating two-dimensional distribution data of the product-moment correlation coefficients regarding the Cr components for each reference image data, and calculating product-moment correlation coefficients between Cb components of each reference image data and parts of Cb components of the subject image data and thereby generating two-dimensional distribution data of the product-moment correlation coefficients regarding the Cb components for each reference image data, and executing an average calculation process, for calculating each geometric average of the product-moment correlation coefficients regarding the Cr and Cb components at the same two-dimensional coordinates, for each reference image data and thereby generating two-dimensional distribution data of the geometric averages for each reference image data, wherein the identifying comprises identifying a piece of two-dimensional distribution data of geometric averages having the highest maximum value among all the two-dimensional distribution data of geometric averages generated for all the reference image data.

4. The method according to claim 3, wherein the number of the pixels of each piece of the reference image data is smaller than the number of the pixels of the subject image data.

5. The method according to claim 3, wherein the numbers of the pixels of the plurality of pieces of the reference image data are the same.

6. The method according to claim 3, wherein the preparing includes generating each of the plurality of pieces of the reference image data by reducing the number of pixels of a plurality of pieces of predetermined model image data.

7. The method according to claim 3, wherein the preparing includes reducing the number of pixels of an object image to generate the subject image.

8. The method according to claim 3, wherein the identifying identifies one of the plurality of pieces of the reference image data which corresponds to the two-dimensional distribution data having the highest maximum value of any two-dimensional distribution data as the reference image data corresponding to the subject image.

* * * * *